US011959385B2

(12) United States Patent
Walkingshaw et al.

(10) Patent No.: US 11,959,385 B2
(45) Date of Patent: Apr. 16, 2024

(54) ADJUSTMENT MECHANISM WITH NOISE REDUCING FEATURES

(71) Applicant: BorgWarner Inc., Auburn Hills, MI (US)

(72) Inventors: Jason Walkingshaw, Heidelberg (DE); Sascha Karstadt, Undenheim (DE); Ahmet Coksen, Mannheim (DE)

(73) Assignee: BorgWarner Inc., Auburn Hills, MI (US)

( * ) Notice: Subject to any disclaimer, the term of this patent is extended or adjusted under 35 U.S.C. 154(b) by 100 days.

(21) Appl. No.: 17/496,010

(22) Filed: Oct. 7, 2021

(65) Prior Publication Data

US 2022/0136403 A1 May 5, 2022

(30) Foreign Application Priority Data

Nov. 3, 2020 (DE) ......................... 102020128922.7

(51) Int. Cl.
*F01D 17/16* (2006.01)
*F01D 25/24* (2006.01)

(52) U.S. Cl.
CPC ........... *F01D 17/165* (2013.01); *F01D 25/24* (2013.01); *F05D 2220/40* (2013.01); *F05D 2240/126* (2013.01); *F05D 2260/96* (2013.01)

(58) Field of Classification Search
CPC .... F04D 15/0022; F04D 17/14; F04D 29/462; F04D 29/464; F04D 29/667; F16K 3/03
See application file for complete search history.

(56) References Cited

U.S. PATENT DOCUMENTS

| | | | | |
|---|---|---|---|---|
| 9,175,786 | B2 * | 11/2015 | Luebbers | F16K 31/502 |
| 10,393,009 | B2 * | 8/2019 | Mohtar | F04D 29/464 |
| 11,401,948 | B2 * | 8/2022 | Lombard | F04D 29/4213 |
| 11,591,926 | B2 * | 2/2023 | Stankevicius | F01D 25/24 |
| 2017/0198713 | A1 * | 7/2017 | Bessho | F02B 39/00 |
| 2019/0048876 | A1 * | 2/2019 | Mohtar | F04D 27/0207 |
| 2019/0264710 | A1 * | 8/2019 | Mohtar | F04D 29/464 |
| 2020/0208652 | A1 | 7/2020 | Bogner et al. | |

FOREIGN PATENT DOCUMENTS

| | | | |
|---|---|---|---|
| DE | 102017216329 | A1 | 3/2019 |
| EP | 3502483 | A1 | 6/2019 |
| EP | 3708849 | A1 | 9/2020 |

OTHER PUBLICATIONS

Machine-assisted English language abstract for DE 10 2017 216 329 A1 extracted from espacenet.com database on Oct. 14, 2021, 3 pages.

* cited by examiner

*Primary Examiner* — Woody A Lee, Jr.
*Assistant Examiner* — Cameron A Corday
(74) *Attorney, Agent, or Firm* — Howard & Howard Attorneys PLLC

(57) ABSTRACT

The present invention concerns an adjustment mechanism (200) for variable adjustment of an inlet cross-section (321) of a compressor inlet (322). The adjustment mechanism comprises a plurality of rotatably mounted baffle elements (210) which are arranged in a circumferential direction (26) and are adjustable between a first position and a second position. At least one baffle element (210) of the plurality of baffle elements (210) comprises an eddy-reducing feature (220).

17 Claims, 16 Drawing Sheets

210
220
221
A
B
x
r
u

A-A
α
β
θ
222
224
r
u
x

B-B
222
225
226
x
r
u 231
232
233
224

261
222
224
225

222
223
226
232
262

ADJUSTMENT MECHANISM WITH NOISE REDUCING FEATURES

CROSS-REFERENCE TO RELATED APPLICATIONS

The present application claims priority to and all the benefits of German Patent Application No. 102020128922.7, filed Nov. 3, 2020, the disclosure of which is expressly hereby incorporated herein by reference in its entirety.

TECHNICAL FIELD

The present invention concerns an adjustment mechanism for variable adjustment of an inlet cross-section of a compressor inlet, and a compressor and a charging device with such an adjustment mechanism.

BACKGROUND

More and more vehicles of the newer generation are equipped with charging devices in order to meet demand targets and legal requirements. In the development of charging devices, both individual components and the system as a whole must be optimized with respect to reliability and efficiency.

Known charging devices comprise at least one compressor with a compressor impeller which is connected to a drive unit via a common shaft. The compressor compresses the fresh air drawn in for the internal combustion engine or fuel cell. In this way, the quantity of air or oxygen which is available to the engine for combustion, or to the fuel cell for reaction, is increased. This in turn leads to a power increase of the internal combustion engine or fuel cell. Charging devices may be equipped with various drive units. The prior art describes in particular E-chargers, in which the compressor is driven via an electric motor, and exhaust gas turbochargers, in which the compressor is driven via an exhaust gas turbine. Combinations of the two systems are also described in the prior art.

Each compressor has a compressor-specific compressor map, wherein operation of the compressor is restricted to the region of the compressor map between the surge limit and the choke limit. Depending on the size and design of the compressor, at low volume flows through the compressor, operation may be inefficient or no longer possible since the surge limit has been reached.

The prior art describes in particular compressors with adjustment mechanisms which are arranged in the inlet region of the compressor, upstream of the compressor impeller in the flow direction. The adjustment mechanism allows the flow cross-section in the compressor inlet to be varied, whereby for example the contact flow speed and volume flow of the compressor impeller can be adjusted. This acts as a map-stabilizing measure, whereby in turn surging of the compressor can be reduced or avoided.

In the known systems, on constriction of the cross-section of the compressor inlet by the adjustment mechanism, a flow interaction can occur between the compressor impeller and the adjustment mechanism. Because of the smooth inner face of the compressor inlet and the components of the adjustment mechanism which are in contact with the flow, a recirculation flow (and/or eddy) can form between the compressor impeller at the components of the adjustment mechanism. These eddies can occur not only between the compressor impeller and the adjustment mechanism, but also in the circumferential direction of the compressor inlet.

Because of the main flow and/or recirculation flow, vortex filaments can form on components of the adjustment mechanism and hit the compressor impeller. These can cause undesirable noise and vibration which can provoke a faster structural fatigue of the compressor impeller and further components.

The object of the present invention is to provide an improved adjustment mechanism for a compressor.

SUMMARY OF THE INVENTION

The present invention concerns an adjustment mechanism for variable adjustment of an inlet cross-section of a compressor inlet according to claim 1. The invention furthermore concerns a compressor according to claim 11 and a charging device for an internal combustion engine or fuel cell according to claim 15 with such an adjustment mechanism.

The adjustment mechanism for variable adjustment of an inlet flow cross-section of a compressor inlet comprises a plurality of rotatably mounted baffle elements which are arranged in a circumferential direction and are adjustable between a first position and a second position. At least one baffle element of the plurality of baffle elements comprises an eddy-reducing feature. When the adjustment mechanism is arranged in front of the compressor impeller in the flow direction in mounted state of the compressor, on a constriction of the cross-section of the compressor inlet by the adjustment mechanism, a flow interaction can occur between the compressor impeller and the plurality of baffle elements. Because of a smooth inner face of the compressor inlet and the plurality of baffle elements, a recirculation flow (e.g. eddy) can form between the compressor impeller and the plurality of baffle elements. Because of the main flow and/or recirculation flow, vortex filaments can form on the plurality of baffle elements and hit the compressor impeller. These eddies may be present, due to rotation of the compressor impeller, both in the circumferential direction and also circulating in the axial and radial direction. This leads to undesirable noise. Because of the eddy-reducing feature on at least one baffle element of the plurality of baffle elements, eddy formation in the circumferential direction, and also in the axial and radial directions between the plurality of baffle elements and the compressor impeller, can be reduced or eliminated, which leads to noise reduction. Also, vibrations can be reduced, whereby structural fatigue of the compressor impeller is reduced and the service life of the compressor impeller and further components of the compressor can be extended.

In some embodiments of the adjustment mechanism, each baffle element of the plurality of baffle elements comprises an eddy-reducing feature. If the eddy-reducing feature is provided on each baffle element of the plurality of baffle elements, mounting of the adjustment mechanism may be facilitated since there is no need to take account of the arrangement of baffle elements during installation. Also, identical baffle elements may be produced, which can reduce production costs.

In some embodiments of the adjustment mechanism which may be combined with any of the preceding embodiments, each baffle element of the plurality of baffle elements comprising an eddy-reducing feature comprises precisely one eddy-reducing feature. In this way, production times of the eddy-reducing features can be reduced and the shape of the precisely one eddy-reducing feature may be designed such that eddy formation is reduced as far as possible.

In some embodiments of the adjustment mechanism which may be combined with any of the preceding embodiments, each baffle element of the plurality of baffle elements comprises a plate body with a first side face, wherein the eddy-reducing feature is arranged on the first side face.

In some embodiments of the adjustment mechanism which may be combined with any of the preceding embodiments, each baffle element has a radial direction, a circumferential direction lying perpendicularly to the radial direction, and an axial direction lying perpendicularly to the radial direction and to the circumferential direction.

In some embodiments of the adjustment mechanism which may be combined with any of the preceding embodiments, the eddy-reducing feature may comprise a recess which is formed in the baffle element.

The recess may be designed longer in the circumferential direction than in the radial direction, in particular by at least 30%, preferably by at least 50%.

In some embodiments of the adjustment mechanism which may be combined with any of the preceding embodiments, the recess may be designed so as to be rectangular in the r-u plane. Alternatively, the recess may be configured so as to be arcuate in the r-u plane.

In some embodiments of the adjustment mechanism which may be combined with any of the preceding embodiments, the recess may have a recess base, a first side wall, a second side wall, a first transverse wall and a second transverse wall. The recess may be delimited by the walls and the recess base.

In some embodiments of the adjustment mechanism which may be combined with the preceding embodiment, the recess may have a depth of at least 30%, preferably at least 60% of the thickness of the plate body, wherein the depth is measured between the first side face and the recess base parallel to the axial direction.

In some embodiments of the adjustment mechanism which may be combined with any of the preceding embodiments, the recess may have a rectangular cross-section in the r-x plane and/or the recess may have a rectangular cross-section in the x-u plane.

In some embodiments of the adjustment mechanism which may be combined with any of the preceding embodiments, each baffle element, in particular the plate body, may have an inner edge, a first side edge and a second side edge. The first side wall may run parallel to the second side wall, and/or the second side wall may run parallel to the inner edge, and/or the first side wall may run parallel to the inner edge. The first transverse wall may run parallel to the second transverse wall, and/or the first transverse wall may run parallel to the first side edge, and/or the second transverse wall may run parallel to the second side edge.

In some embodiments of the adjustment mechanism which may be combined with any of the preceding embodiments, the recess base may be formed flat and run parallel to the r-u plane.

In some embodiments of the adjustment mechanism which may be combined with any of the preceding embodiments, the recess may have a trapezoid cross-section in the r-x plane. In particular, the first side wall in the r-x plane may run linearly between the recess base and the side face at an angle $\alpha$, and/or the second side wall in the r-x plane may run linearly between the recess base and the side face at an angle $\beta$. Alternatively, the recess may have a triangular cross-section in the r-x plane. In particular, the first side wall in the r-x plane may run linearly between the recess base and the side face at an angle $\alpha$, and/or the second side wall in the r-x plane may run linearly between the recess base and side face at an angle $\beta$.

In some embodiments of the adjustment mechanism which may be combined with any of the preceding embodiments, the recess base may have an arcuate cross-section in the x-u plane. Alternatively, the recess may have a triangular cross-section in the x-u plane. In particular, the first transverse wall in the x-u plane may run linearly between the recess base and the side face at an angle $\sigma$, and/or the second transverse wall in the x-u plane may run linearly between the recess base and the side face at an angle $\varphi$.

In some embodiments of the adjustment mechanism which may be combined with any of the preceding embodiments, the recess base in the r-x plane may run linearly at an angle $\theta$ to the side face.

In some embodiments of the adjustment mechanism which may be combined with any of the preceding embodiments, the second transverse wall starting from the side face may have a first transverse wall portion and a second transverse wall portion. In particular, the first transverse wall portion may be designed so as to be linear in the x-u plane, and the second transverse wall portion may be designed so as to be arcuate in the x-u plane.

In some embodiments of the adjustment mechanism which may be combined with any of the preceding embodiments, the recess may be slot-like and/or circular in the r-u plane.

In some embodiments of the adjustment mechanism which may be combined with the preceding embodiment, the recess may have a semicircular cross-section in the r-x plane and/or in the x-u plane. Alternatively, the recess may be formed so as to be triangular in the r-u plane, have a trapezoid cross-section in the r-x plane and a rectangular cross-section in the x-u plane.

In some embodiments of the adjustment mechanism which may be combined with any of the preceding embodiments, the recess base in the r-x plane may run at an angle $\theta<0°$ and the first side wall may run at an angle $\alpha=90°$ and the second side wall at an angle $\beta>90°$.

As an alternative to the recess, the eddy-reducing feature may be configured as a chamfer on the baffle element. In particular, the chamfer in the x-u plane may run linearly between the first side edge and the second side edge at an angle $\lambda$.

In some embodiments of the adjustment mechanism which may be combined with any of the preceding embodiments, the adjustment element may furthermore comprise an adjustment ring, wherein the plurality of baffle elements may be operatively connected to the adjustment ring. In particular, the adjustment ring may comprise several coupling recesses distributed in the circumferential direction for coupling to the baffle elements. The adjustment ring may comprise an eddy-reducing feature. The eddy-reducing feature may comprise at least one recess which extends into the adjustment ring in the radial direction from an inner edge of the adjustment ring. Alternatively, the eddy-reducing feature may comprise at least one protrusion which extends from the inner edge of the adjustment ring in the radial direction towards the axis.

In some embodiments of the adjustment mechanism which may be combined with any of the preceding embodiments, the adjustment mechanism may furthermore comprise an actuating device. The actuating device may have a housing part and a lever group with a bearing portion, a drive input portion and a drive output portion. The drive output portion may be designed to be coupled to the adjustment ring of the adjustment mechanism on a first side of the housing part. The drive input portion may be able to be coupled to an actuator rod on a second side of the housing part. The lever group may be rotatably mounted in the housing part via the bearing portion. The adjustment ring may have at least one baffle recess and preferably precisely one baffle recess for coupling to the lever group.

In some embodiments of the adjustment mechanism which may be combined with any of the preceding embodiments, the adjustment mechanism may furthermore comprise a bearing ring in which the baffle elements are rotatably mounted. Alternatively, the baffle elements may be rotatably mounted in a compressor housing. If a bearing ring is provided, the bearing ring may have an eddy-reducing feature. The eddy-reducing feature may comprise at least one recess which extends into the bearing ring in the radial direction from an inner edge of the bearing ring. Alternatively, the eddy-reducing feature may comprise at least one protrusion which extends from an inner edge of the bearing ring in the radial direction towards the axis.

In some embodiments of the adjustment mechanism which may be combined with any of the preceding embodiments, the plurality of baffle elements may each comprise a bearing journal via which they are adjustable between the first position and the second position.

In some embodiments of the adjustment mechanism which may be combined with any of the preceding embodiments, the plurality of baffle elements may each comprise a coupling element via which they are operatively coupled to coupling recesses in the adjustment ring.

The present invention furthermore concerns a compressor which comprises a compressor housing and a compressor impeller arranged therein. The compressor housing has a compressor inlet with an inlet cross-section and a compressor outlet with a compressor volute. The compressor comprises an adjustment mechanism according to any of the preceding embodiments, wherein the inlet cross-section of the compressor inlet is variably adjustable by means of the adjustment mechanism.

In some embodiments of the compressor which may be combined with the preceding embodiment, the eddy-reducing feature may be arranged in the axial direction on a side of the plurality of baffle elements facing the compressor impeller, in particular wherein the side face faces the compressor impeller.

In some embodiments of the compressor which may be combined with any of the preceding embodiments, the compressor inlet may have an inner circumferential face, wherein the inner circumferential face may have an eddy-reducing feature. In particular, in the axial direction, the eddy-reducing feature may be arranged between the compressor impeller and the adjustment mechanism. The eddy-reducing feature may comprise at least one recess which extends into the compressor housing in the radial direction from the inner circumferential face.

In some embodiments of the compressor which may be combined with any of the preceding embodiments, the adjustment mechanism may open the inlet cross-section in the first position of the baffle elements and reduce it in the second position of the baffle elements.

In some embodiments of the compressor which may be combined with any of the preceding embodiments, the housing part may serve as an inlet connector of the compressor housing and be arranged on a flange face of the compressor housing on the compressor inlet side.

In some embodiments of the compressor which may be combined with any of the preceding embodiments, the compressor housing may have a depression coaxially surrounding the compressor inlet for receiving the baffle elements, the adjustment ring and optionally the bearing ring.

In some embodiments of the compressor which may be combined with any of the preceding embodiments, the compressor may furthermore comprise an actuator with an actuator rod via which the actuator is coupled to the lever group.

The present invention furthermore concerns a charging device for an internal combustion engine or a fuel cell which comprises a drive unit and a shaft. The charging device comprises a compressor according to any of the preceding embodiments, wherein the compressor impeller of the compressor is coupled to the drive unit via the shaft. The drive unit may comprise a turbine and/or an electric motor.

BRIEF DESCRIPTION OF THE FIGURES

FIGS. 4A-16F show various possible embodiments and views of a baffle element of the adjustment mechanism.

DETAILED DESCRIPTION

Figure 1:
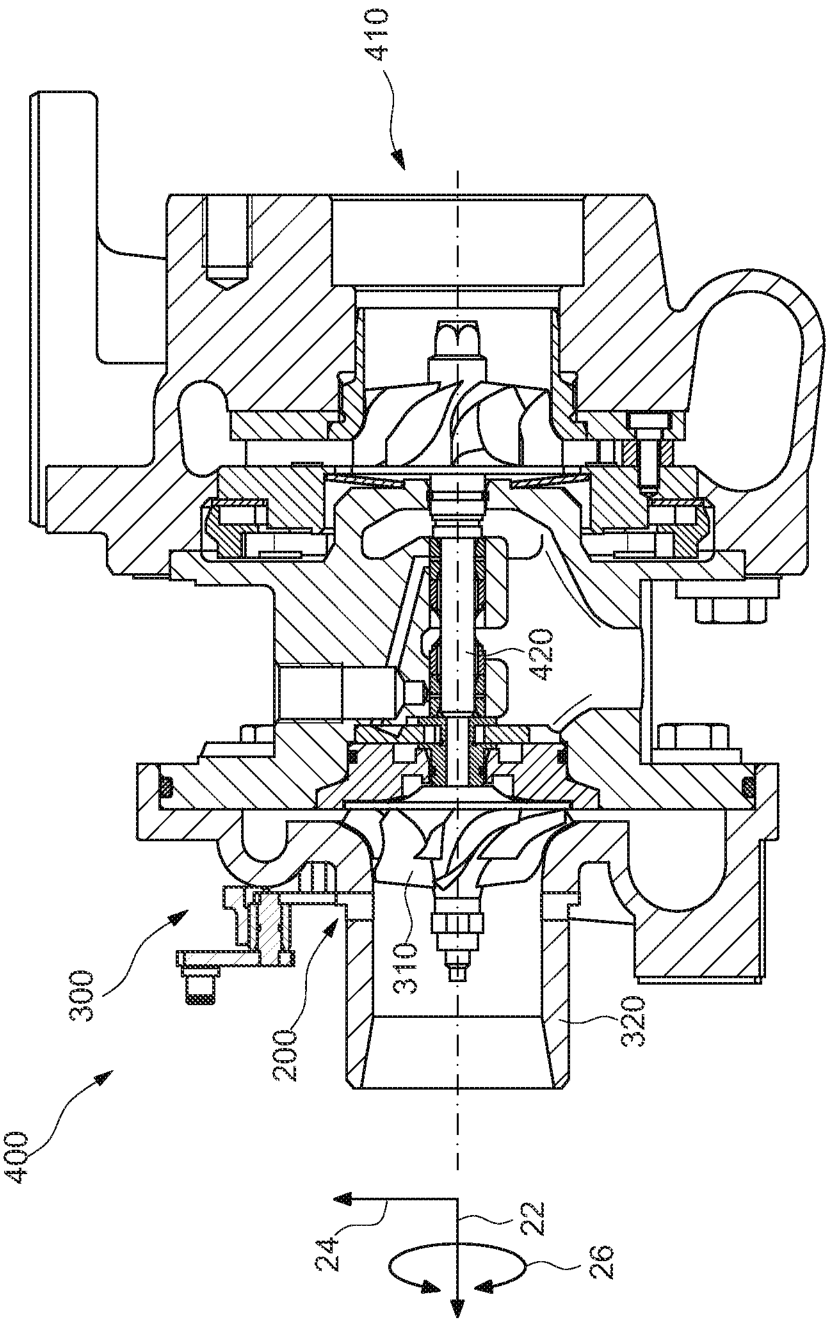
FIG. 1 shows a sectional side view of a charging device with an adjustment mechanism according to the invention, depicted schematically.

In the context of this application, the terms "axial" and "axial direction" relate to a rotational axis of the adjustment ring/bearing ring/compressor/compressor inlet (all four have the same axis). With reference to the figures (see e.g. FIGS. 1-3 and 4A), the axial direction of the adjustment ring/bearing ring/compressor/compressor inlet is depicted with reference sign 22. A radial direction 24 here relates to the axis 22 of the adjustment ring/bearing ring/compressor/compressor inlet. Also, a circumference or circumferential direction 26 relates to the axis 22 of the adjustment ring/bearing ring/compressor/compressor inlet. The axes 22, 24, 26 run orthogonally to one another. Also, each baffle element of the plurality of baffle elements has an axial direction x, a radial direction r and a circumferential direction u. These directions are each defined with respect to the directions or axes 22, 24, 26 and each lie parallel to the axes 22, 24, 26. As FIG. 4A shows, the axial direction x of a baffle element runs parallel to the axial direction 22 of the compressor. The radial direction r of a baffle element runs in the same direction as or parallel to the radial direction 24 of the compressor. The circumferential direction u of a baffle element runs in the same direction as or parallel to the circumferential direction 26. Also, the directions x, r, u of a baffle element each run orthogonally to one another.

FIG. 1 shows a charging device 400 with a drive unit 410 and shaft 420, and a compressor 300. The charging device 400 may be used for an internal combustion engine or a fuel cell. The compressor 300 comprises a compressor housing 320 in which a compressor impeller 310 is arranged. The compressor impeller 320 is coupled to the drive unit 410 via the shaft 420. The drive unit 410 is here configured exclusively as a turbine. In addition, the drive unit 410 could comprise an electric motor. Alternatively, the drive unit 410 could exclusively comprise an electric motor without turbine. As indicated schematically in FIG. 1, the compressor 300 comprises an adjustment mechanism 200 according to the invention. In addition, the compressor 300 may comprise an actuating device 10 which is however indicated merely schematically in FIG. 1. The adjustment mechanism 200 according to the invention and the actuating device are explained in more detail in connection with the following figures.

Figure 2:
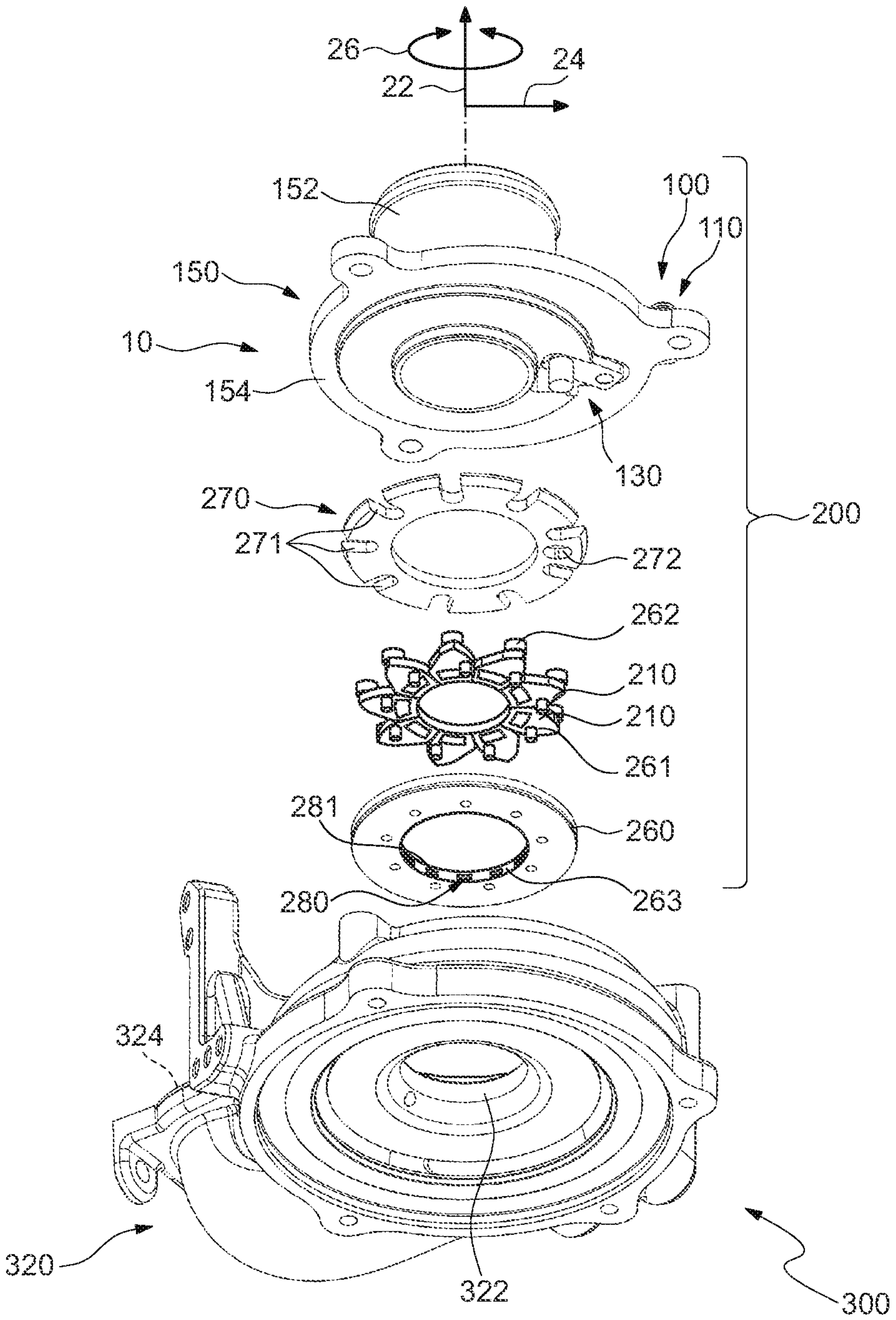
FIG. 2 shows, obliquely from below, an exploded view of a compressor with the adjustment mechanism according to the invention and an actuation device.
Figure 3:
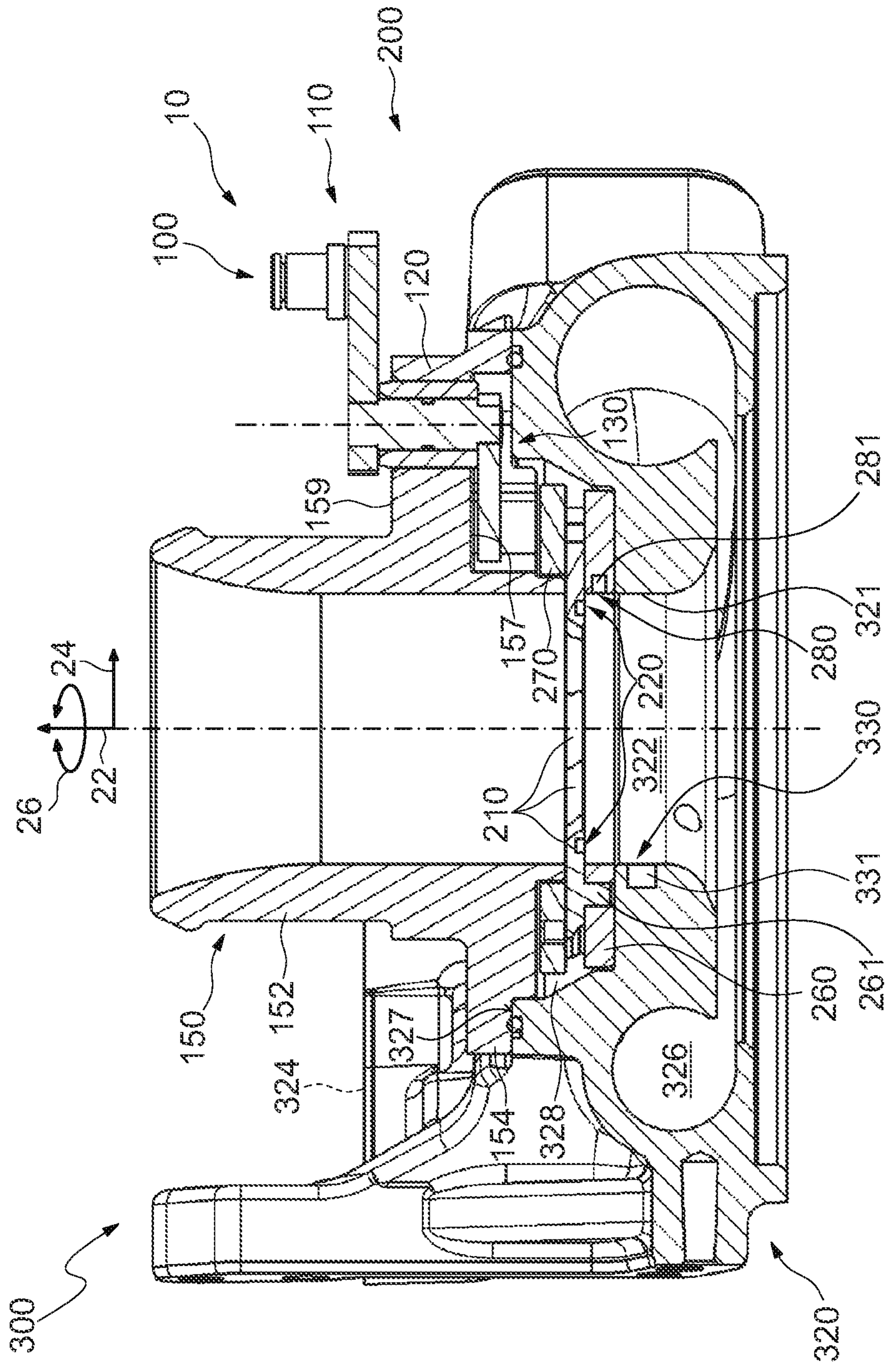
FIG. 3 shows a sectional side view of a compressor with the adjustment mechanism according to the invention.
Figures 4A, 4B, 4C, 4D, 4E, 4F:
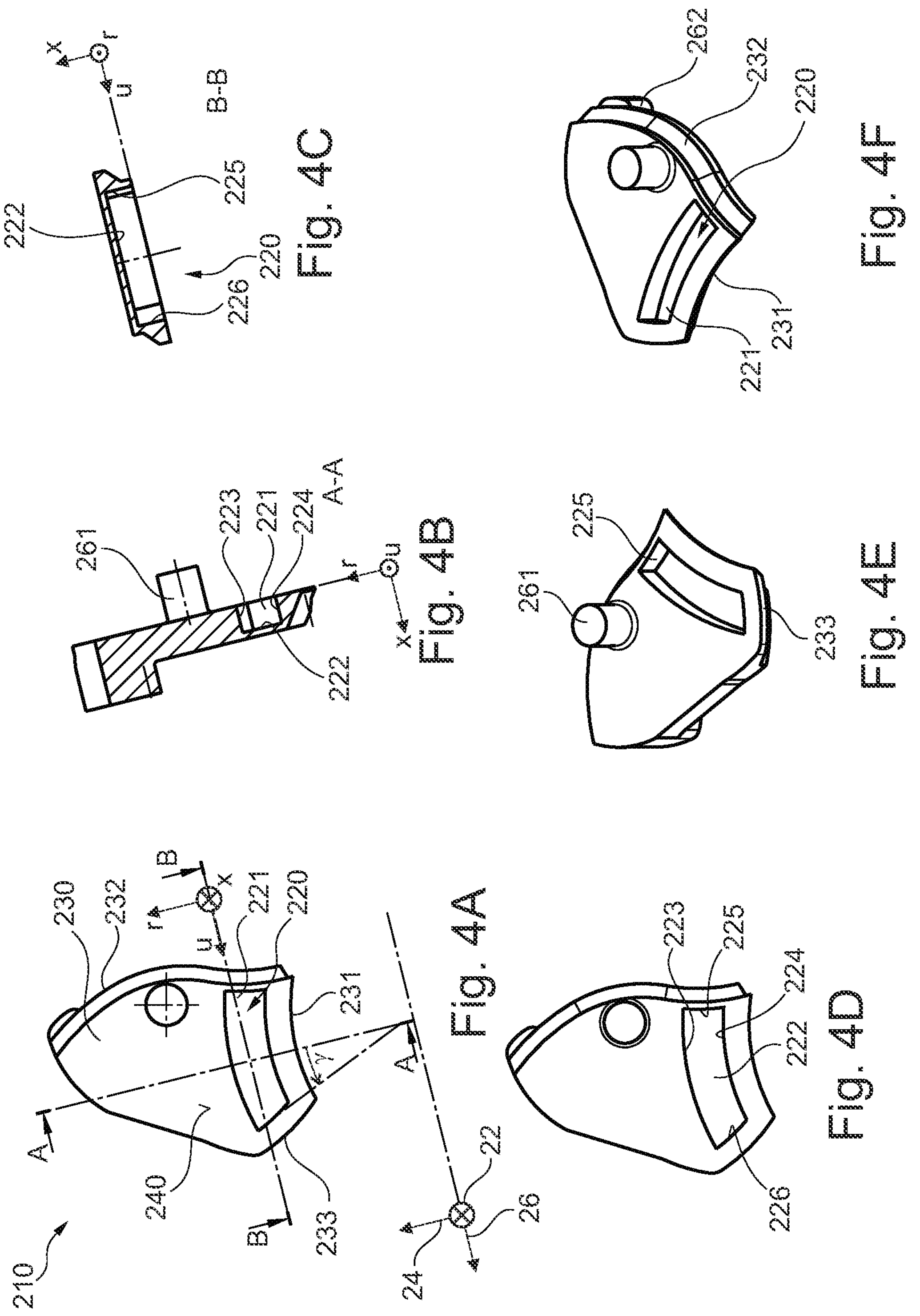

FIGS. 2-3 respectively show an exploded illustration and a sectional side view of the compressor 300 with the adjustment mechanism 200 according to the invention for variable adjustment of an inlet cross-section 321 of a compressor inlet 322. The compressor 300 comprises a compressor housing 320 and a compressor impeller 310 arranged therein (the compressor impeller 310 is shown only in FIG. 1). The compressor housing 320 defines the compressor inlet 322 with an inlet cross-section 321 and a compressor outlet 324 with a compressor volute 326 (see FIG. 3). The compressor inlet 322 comprises an inner circumferential face 323. The inlet cross-section 321 of the compressor inlet 322 is variably adjustable by means of the adjustment mechanism 200. The compressor housing 320 comprises a flange face 327 for attachment of an inlet connector 150 which is configured as a housing part. Furthermore, the compressor housing 320 comprises a depression 328 coaxially surrounding the compressor inlet 322. The depression 328 is arranged radially inside the flange face 327. In other words, the flange face 327 surrounds the depression 328 of the compressor housing 320 substantially coaxially or outwardly in the radial direction 24. Here, the flange face 327 is raised in the axial direction 22 relative to the depression 328. The compressor may furthermore comprise an actuator with an actuator rod (neither shown here). The actuator can be coupled to a lever group via the actuator rod.

As clearly evident from the exploded illustration of FIG. 2, the adjustment mechanism 200—which is designed for variable adjustment of the inlet cross-section 321 of the compressor inlet 322—comprises an actuating device 10, a plurality of baffle elements 210, an adjustment ring 270 and a bearing ring 260. The plurality of baffle elements 210 are rotatably mounted, arranged in the circumferential direction 26 and adjustable between a first position and a second position. The adjustment mechanism 200 opens the inlet cross-section 321 in the first position of the baffle elements 210 and reduces the inlet cross-section 322 in the second position of the baffle elements 210. As evident from FIGS. 2-3, the baffle elements 210 are rotatably mounted in the bearing ring 260. For this, each baffle element 210 of the plurality of baffle elements 210 comprises a bearing journal 261, which can be rotatably coupled to the bearing ring 260 and via which the baffle elements 210 are adjustable between the first position and the second position. The adjustment mechanism 200 furthermore comprises an adjustment ring 270, wherein the plurality of baffle elements 210 are operatively coupled to the adjustment ring 270. The adjustment ring 270 is designed to be arranged on the compressor housing 320. In particular, the adjustment ring 270 is designed to be arranged or inserted in the coaxial depression 328 of the compressor housing 320. Similarly, the coaxial depression 328 is designed (e.g. dimensioned) for optionally receiving the bearing ring 260. In other words, the bearing ring 260, the baffle elements 210 and the adjustment ring 270 are mounted in the coaxial depression 328. As shown in FIG. 3, in a state mounted with the compressor 300, the adjustment mechanism 200 is arranged between the plurality of baffle elements 210 and the compressor impeller 310 in the axial direction 22 of the bearing ring 260.

In alternative embodiments, the adjustment mechanism 200 may also have no bearing ring 260. In such an embodiment, the baffle elements 210 may then be rotatably mounted directly in the compressor housing 320 (or in the coaxial depression 328). In such a design, the compressor housing 320 or the coaxial depression 328 may be configured so as to receive only the baffle elements 210 and the adjustment ring 270. Here, the compressor housing 320 may for example have bores in the region of the coaxial depression 328 for rotatable mounting of the baffle elements 210. In mounted state of the adjustment mechanism 200 upstream of the compressor impeller 310, the adjustment ring 270 may be arranged in the axial direction 22 between the plurality of baffle elements 210 and the compressor impeller 310. In this embodiment, a baffle element 210 of the plurality of baffle elements may be operatively coupled to an actuator via a shaft. The actuator may exert a rotary movement on the one baffle element 210. Via the adjustment ring 270, a baffle element 210 coupled to the actuator may be coupled to all further baffle elements. The adjustment ring 210 may transmit a movement of the baffle element 210, which is coupled to the actuator, to all further baffle elements 210 of the plurality thereof. In particular, the adjustment ring 270 may be configured as a transmission ring.

As shown in FIG. 2, the adjustment ring 270 comprises several coupling recesses 271 distributed in the circumferential direction 26 for coupling to the baffle elements 210. The coupling recesses 271 are configured as grooves and run substantially in the radial direction 24. Each of the plurality of baffle elements 210 comprises a coupling element 262 which is designed to engage in the respective coupling recess 271, so that the baffle elements 210 are operatively coupled to the adjustment ring 270. A respective length of the coupling recesses 271 is limited towards the inside and not limited towards the outside in the radial direction 24. Alternatively, the length of the coupling recesses 271 may also be limited towards the outside and not limited towards the inside in the radial direction 24, or be limited both towards inside and towards the outside in the radial direction 24. Furthermore, the adjustment ring 270 comprises at least one baffle recess 272, and preferably precisely one baffle recess 272 for operative coupling to the lever group 100.

FIGS. 2-3 show the adjustment mechanism 200 according to the invention and the actuating device 10. The actuating device 10 comprises a housing part 150 and a lever group 100. The lever group 100 comprises a bearing portion 120, a drive input portion 110 and a drive output portion 130. The bearing portion 120 is formed so as to be substantially cylindrical. The drive output portion 130 is designed to be coupled to the adjustment ring 210 of the adjustment mechanism 200 on a first side 157 of the housing part 150. On a second side 159 of the housing part 150, the drive input portion 110 may be coupled to an actuator rod (not shown). As evident also in particular in FIG. 3, the lever group 100 is here rotatably mounted in the housing part 150 on the compressor inlet side via the bearing portion 120. It is furthermore evident that in the installed state of the housing part 150, the first side 157 corresponds to a side inside the compressor 300. In the installed state of the housing part 150, the second side 159 corresponds to a side outside the compressor 300. The compressor inlet side here means a side which faces away from a bearing housing of the charging device 400 or from the drive unit 410 of the charging device 400, starting from the compressor impeller 310. More precisely, this means a side relative to the adjustment ring 270 which faces away from the drive unit 410 of the charging device 400. A compact actuating device 10 may be provided by the rotatable mounting of the lever group 100 in the housing part 150. The possibility of individual coupling of the drive output portion 130 to the adjustment ring 270, and of the drive input portion 110 to the actuator rod, simplifies the mounting process and creates greater flexibility.

The housing part 150 comprises a cylindrical portion 152 and a flange portion (also called a flange) 154. The flange portion 154 comprises a bore arranged in the bearing portion 120. The actuating device 10 furthermore comprises a bearing sleeve which is arranged in the bore of the housing part 150 (see in particular FIG. 3). The bearing portion 120 is again rotatably mounted in the bearing sleeve. Alternatively, the actuating device 10 may also comprise no bearing sleeve. In such a design, the bearing portion 120 is rotatably mounted directly in the bore. As evident in particular from FIG. 3, the housing part 150 serves as an inlet connector for the compressor housing 320 (therefore the housing part 150 may also be called the inlet connector 150). The housing part 150 may be formed integrally with the compressor housing 320 or as a separate component. The housing part 150 is arranged on the compressor inlet side on the flange face 327 of the compressor housing 320. More precisely, the housing part 150 is arranged via the flange portion 154 on the flange face 327 of the compressor housing 320. This allows simple integration of an adjustment mechanism 200 in a compressor housing 320, or integration of an actuating device 10 in an inlet connector (housing part 150).

As illustrated in FIGS. 2-16F, at least one baffle element 210 of the plurality of baffle elements 210 of the adjustment mechanism 200 according to the invention has an eddy-reducing feature 220. The adjustment mechanism 200 is arranged upstream of the compressor impeller 310 in the installed/mounted state. On constriction of the cross-section of the compressor inlet 322, in particular during adjustment of the plurality of baffle elements 210, a flow interaction can occur between the compressor impeller 310 and the baffle elements 210. Because of a smooth inner circumferential face 323 of the compressor inlet 322 and the plurality of baffle elements 210, a recirculation flow (or eddy) can form between the compressor impeller 310 and the plurality of baffle elements 210. Because of the main flow and/or recirculation flow, vortex filaments can form on the plurality of baffle elements 210 which hit the compressor impeller 310. These eddies may occur or be present, due to rotation of the compressor impeller, both in the circumferential direction 26 or also circulating in the axial direction 22 and radial direction 24. The interaction of the eddies with the compressor impeller 310, in particular with the blades of the compressor impeller 310, may lead to undesirable noise and vibrations. By means of the eddy-reducing feature 220 on at least one baffle element 210 of the plurality of baffle elements 210, an eddy formation between the plurality of baffle elements 210 and the compressor impeller 310 in the circumferential direction 26, and also in the axial direction 22 and radial direction 24, can be reduced or eliminated. This may lead to a noise reduction. Also, vibrations may be reduced, whereby a structural fatigue of the compressor impeller 310 can be reduced and the service life of the compressor impeller 310 and further components of the compressor 300 may be extended.

As shown in FIG. 2, each baffle element 210 of the plurality of baffle elements 210 has an eddy-reducing feature 220. If the eddy-reducing feature 220 is provided on each baffle element 210 of the plurality of baffle elements 210, mounting of the adjustment mechanism 200 may be simplified since there is no need to take account of the arrangement of the baffle elements 210 during installation. Also, identical baffle elements 210 can be produced, which may reduce production costs. Alternatively, several baffle elements 210 of the plurality of baffle elements 210 may have an eddy-reducing feature 220. In particular, every second, third or fourth baffle element 210 of the plurality of baffle elements 210 may have an eddy-reducing feature 220. This has the advantage that fewer baffle elements 210 need be machined with material removal, which may lower manufacturing costs. The eddy-reducing feature 220 may be composed of several geometric forms which may be spatially separated from one another. As shown in FIG. 2 however, each baffle element 210 of the plurality of baffle elements 210 has precisely one eddy-reducing feature 220. Precisely one eddy-reducing feature 220 on a baffle element 210 means that the eddy-reducing feature 220 cannot have several geometric forms which are for example geometrically separated from one another. Precisely one eddy-reducing feature 220 thus means that precisely one geometric form is provided on a baffle element 210, for example precisely one recess. If not every baffle element 210 has an eddy-reducing feature 220, i.e. for example only every second, third or fourth baffle element 210 has an eddy-reducing feature 220, accordingly only the baffle elements 210 with eddy-reducing feature 220 may have precisely one such eddy-reducing feature 220.

As shown in FIGS. 2-16F, each baffle element 210 of the plurality of baffle elements 210 has a plate body 230 with a thickness D and a first side face 240. The plate body 230 of each baffle element 210 comprises an inner edge 231 which lies radially on the inside with respect to the axial direction 22 of the compressor 300. Also, the plate body 230 has a first side edge 232 and a second side edge 233, which each adjoin a corresponding first or second side edge 232, 233 of the respective next baffle element 210 in the circumferential direction 26. The eddy-reducing feature 220 is in each case arranged on the first side face 240. In a mounted/installed state of the adjustment mechanism 200 upstream of the compressor impeller 310, the plurality of baffle elements 210 are arranged such that the first side face(s) 240 faces/face the compressor impeller 310. In other words, the eddy-reducing feature 220 in the axial direction 22 is arranged upstream of the compressor impeller 310 on a side of the baffle elements 210 facing the compressor impeller 310.

FIGS. 4A-16F show various designs of the eddy-reducing feature 220 of the at least one baffle element 210. The eddy-reducing feature 220 comprises a recess 221, in particular on the first side face 240, in which the baffle element 210 is formed. As described above, in some embodiments of the eddy-reducing feature 220, further recesses 221 may be provided which are formed in a baffle element 210 and spatially separated from one another. In other words, the recesses 221 are spaced apart from one another on the baffle element 210 and separated from one another by a wall. If however the baffle element 210 has precisely one eddy-reducing feature 220, also only precisely one recess 221 is formed on the baffle element 210.

Each baffle element 210 has a radial direction r, an axial direction x and a circumferential direction u. The directions are each orthogonal to one another. An r-u plane is defined by the radial direction r and the circumferential direction u. The r-u plane is arranged on the first side face 240. The axes of the radial direction r and the circumferential direction u may intersect at a geometric center point of the eddy-reducing feature 220. An r-x plane is defined by the radial direction r and the axial direction x. The r-x plane runs orthogonally to the r-u plane and constitutes a cross-section A-A of the baffle element 210. An x-u plane is defined by the axial direction x and the circumferential direction u. The x-u plane runs orthogonally to the r-u plane and to the r-x plane and constitutes a cross-section B-B of the baffle element 210.

FIGS. 4A-4F show a first design of the recess 221. The recess 221 comprises a recess base 222, a first side wall 223, a second side wall 224, a first transverse wall 225 and a second transverse wall 226. The recess is delimited by the walls 223, 224, 225, 226 and the recess base 222. The side walls 223, 224 run substantially in the circumferential direction u and the transverse walls 225, 226 run substantially in the radial direction r. The recess 221 is designed longer in the circumferential direction u than in the radial direction r, in particular by at least 30%, preferably by at least 50%. Thus, the side walls 223, 224 have a greater length than the transverse walls 225, 226. Alternatively, the recess 221 may be designed longer in the radial direction r than in the circumferential direction u (not shown in the figures). In this design, the transverse walls 225, 226 have a greater length than the side walls 223, 224. The recess 221 is designed so as to be arcuate in the r-u plane. The arcuate form of the recess 221 is provided, starting from the intersection of the r-u axes, with a curvature in the radial direction r, in particular in convex form. Alternatively, the arcuate form may be provided with a curvature against the radial direction r, in particular in concave form. The recess 221 may also have an arcuate form, in particular a convex or concave form, in the circumferential direction u. In particular, the side walls 223, 224 and the transverse walls 225, 226 may be arranged so as to achieve the best possible eddy reduction in the installed/fitted state of the adjustment mechanism 200. The first side wall 223, the second side wall 224, the first transverse wall 225 and the second transverse wall 226 are designed so as to be arcuate in the r-u plane. Here, the first side wall 223 runs parallel to the second side wall 224 and/or to the inner edge 231. Also, the first transverse wall 225 runs parallel to the first side edge 232, and the second transverse wall 226 runs parallel to the second side edge 233. In some embodiments however, the first side wall 223 may also run parallel to the second side wall 224, and/or the second side wall 224 may run parallel to the inner edge 231, and/or the first side wall 223 may run parallel to the inner edge 231. The first transverse wall 225 may run parallel to the first transverse wall 226, and/or the first transverse wall 225 may run parallel to the first side edge 232, and/or the second transverse wall 226 may run parallel to the second side edge 233. As shown in FIG. 4B and FIG. 4C, the recess 221 has a rectangular cross-section in the r-x plane and in the x-u plane. In some embodiments, the recess 221 may have a rectangular cross-section in the r-x plane or in the x-u plane. The recess 221 extends, starting from the radial direction r, in the r-u plane on both sides of the radial direction r up to an angle γ, wherein the angle γ is measured between the radial direction r and the first and/or second transverse wall 225, 226. In some embodiments, the recess 221 may extend with respect to the radial direction r on one side up to an angle γ and on the other side up to an angle which is greater than or less than the angle γ. The recess base 222 is formed flat and runs parallel to the r-u plane or to the side face 240. Depending on the embodiment of the side walls 223, 224 and the transverse walls 225, 226, the recess 221 may however also be configured so as to be rectangular, arcuate, polygonal or triangular parallel to the r-u plane. If the respective walls are formed orthogonally to the r-u plane (or parallel to the axial direction x), the recess 221 may extend from the side face 240 to the recess base in the axial direction x with the same form as in the r-u plane. The recess base 222 then runs parallel to the r-u plane and is configured flat. Depending on the embodiment of the side walls 223, 224 and/or the transverse walls 225, 226, the recess base 222 may however also have only a linear form, in particular wherein the recess base 222 is not formed flat. In some embodiments of the side and transverse walls 223, 224, 225, 226, the recess base 222 may also have only a pointed form. For example, this embodiment results if all side and transverse walls 223, 224, 225, 226 run at an angle to the r-u plane, and the recess 221 runs as a pyramid to the recess base 222.

In a further embodiment (not shown in the figures), the recess 221 may be configured so as to be rectangular in the r-u plane. Here, the recess 221 may be formed on the baffle element 210 rotated about the x axis at any angle in the r-u plane. The first side wall 223 and/or the second side wall 224, and/or the first transverse wall 225 and/or the second transverse wall 226, may be configured so as to be linear in the r-u plane, depending on the respective design of the recess 222 in the r-u plane. In yet other embodiments, the first transverse wall 225 and/or the second transverse wall 226 may be configured so as to be linear, and the first side wall 223 and/or the second side wall 224 may be configured so as to be arcuate in the r-u plane. If the transverse walls 225, 226 are linear, the first transverse wall 225 and/or the second transverse wall 226 may be arranged at the angle γ relative to the radial direction r. In all embodiments, the respective edges between the walls 223, 224, 225, 226 and the recess base 222 may be partially or respectively rounded.

Figures 5A, 5B, 5C, 5D, 5E, 5F:
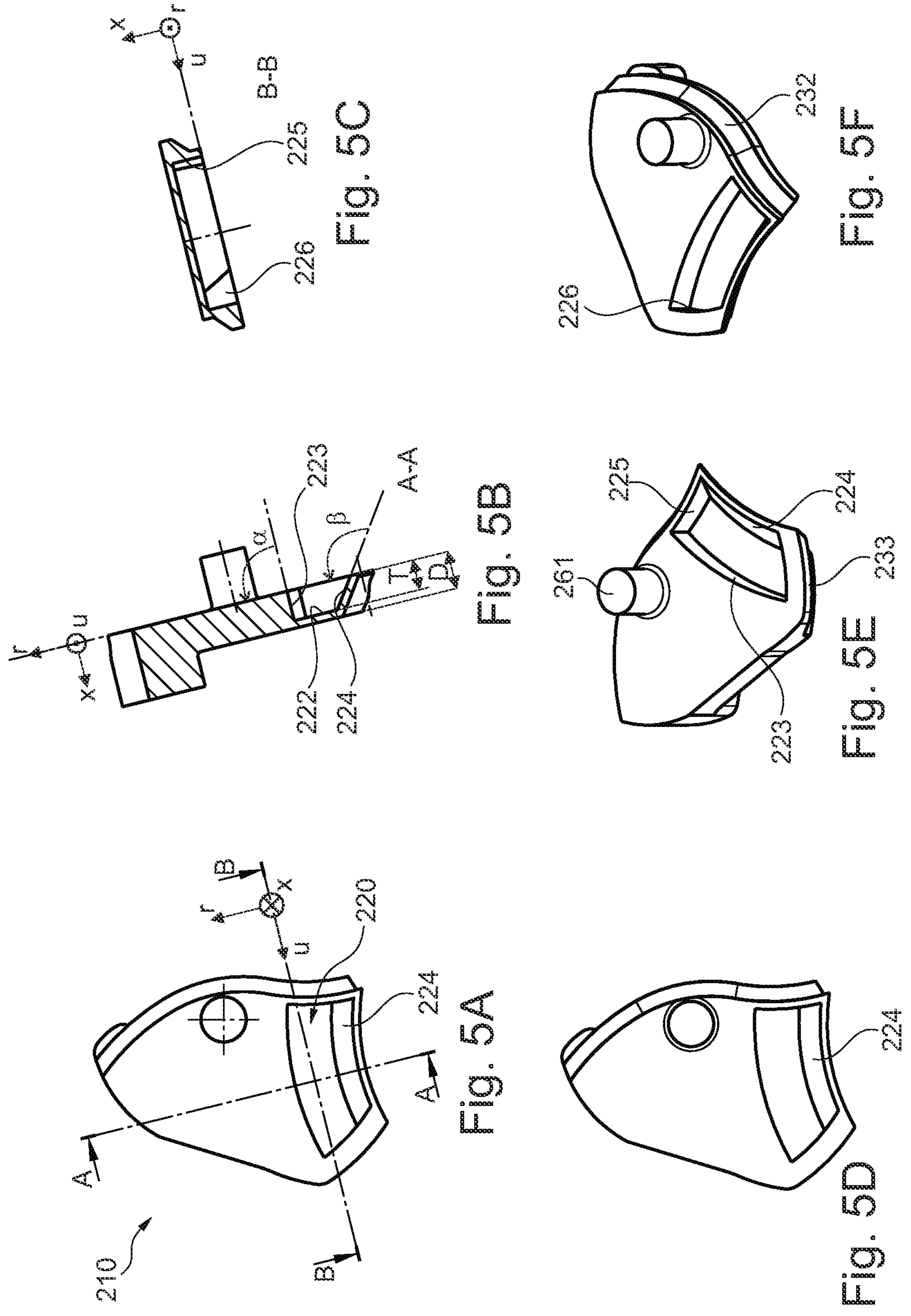
Figures 6A, 6B, 6C, 6D, 6E, 6F:
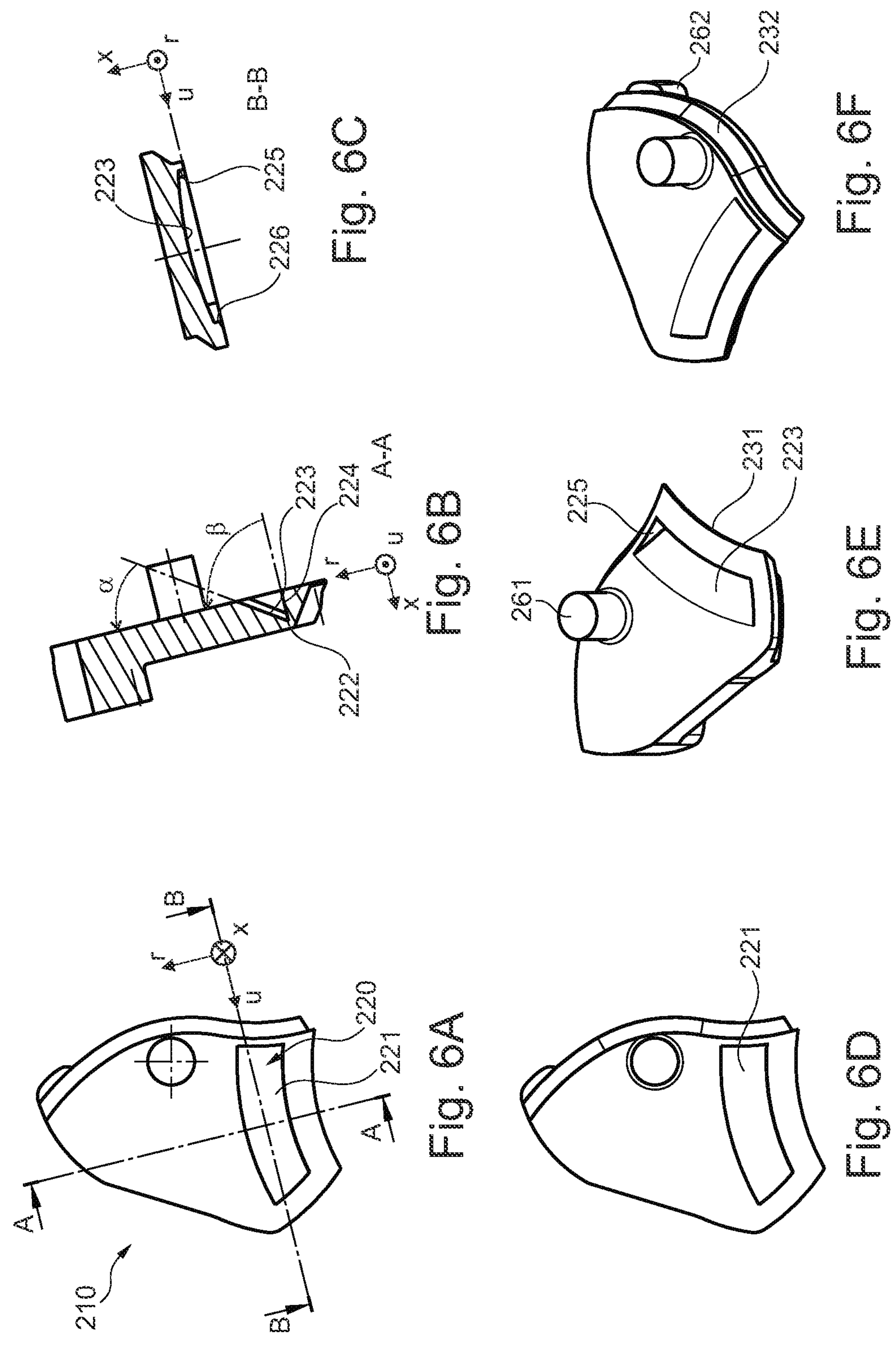
Figure 7A:
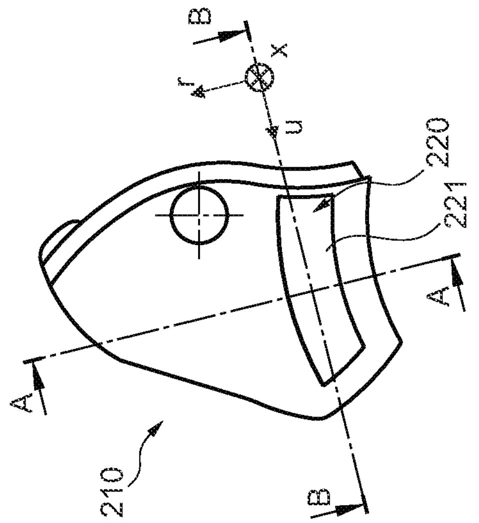
Figure 7B:
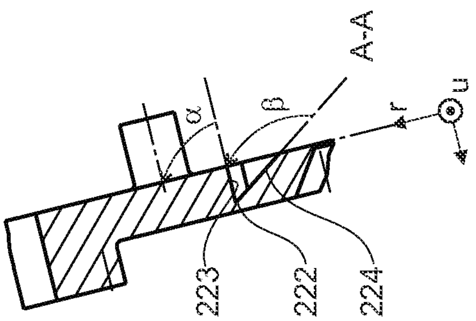
Figure 7C:
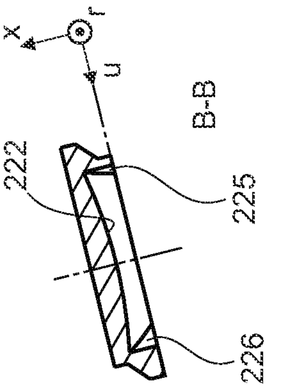
Figure 7D:
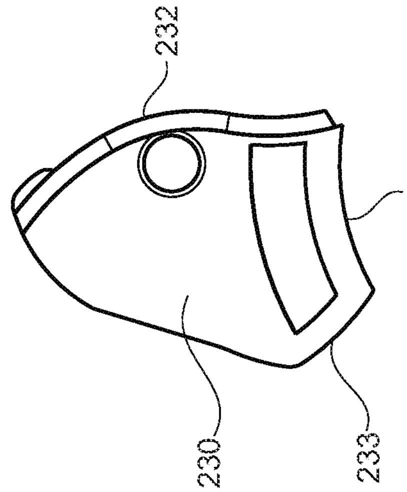
Figure 7E:
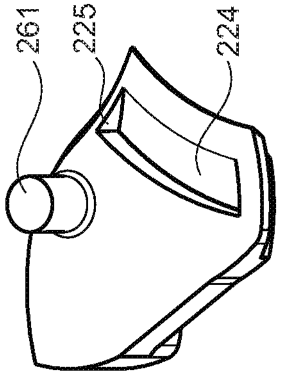
Figure 7F:
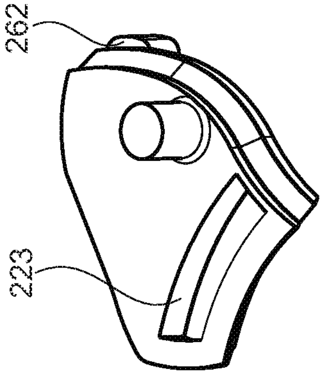
Figure 8A:
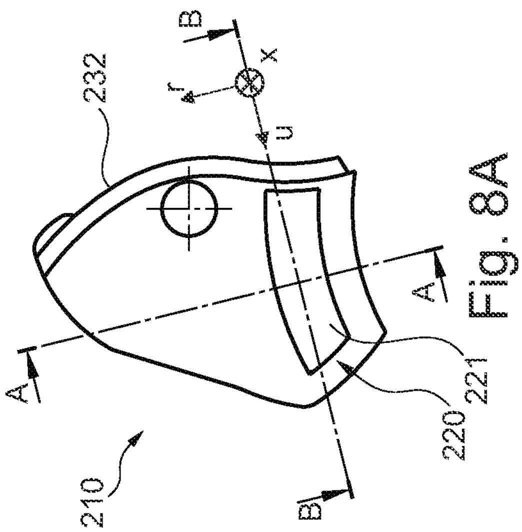
Figure 8B:
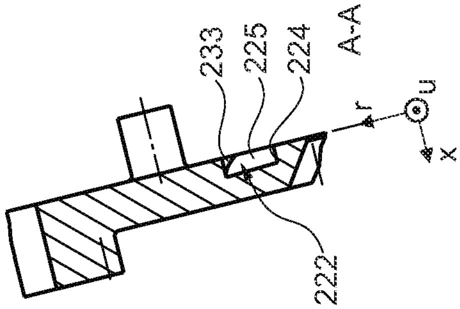
Figure 8C:
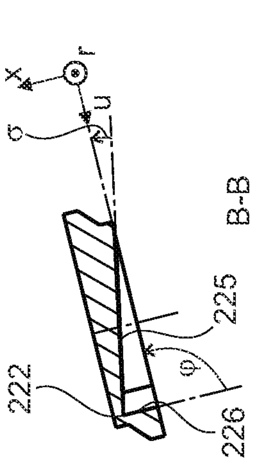
Figure 8D:
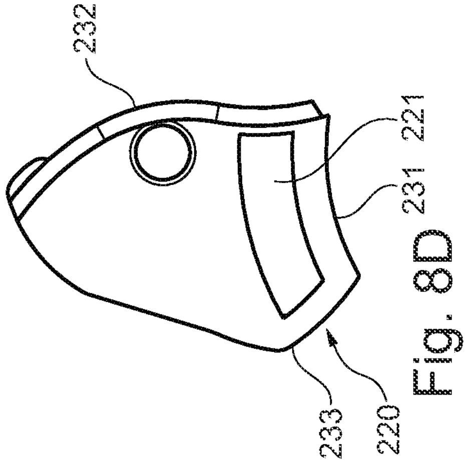
Figure 8E:
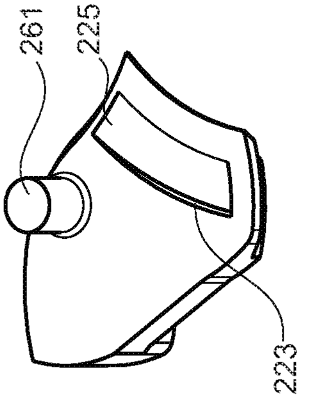
Figure 8F:
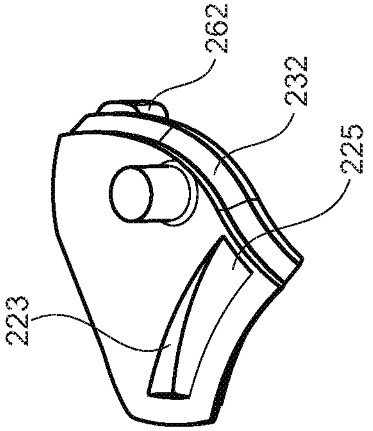

As shown for example in FIG. 5B, the recess 221 has a depth T which is measured between the first side face 240 and the recess base 222, parallel to the axial direction x. The recess 221 has a depth T of at least 30%, preferably at least 60% of the thickness D of the plate body 230. The depth T of the recess 221 amounts at most to 90% of the thickness D of the plate body 230. Alternatively, the depth T may amount at most to 70% of the thickness D of the plate body 230. The recess does not extend through the entire thickness D of the plate body 230. In other words, the depth T may be between at least 30% and most 95% of the thickness D of the plate body 230, preferably between at least 60% and most 90% of the thickness D of the plate body 230.

FIGS. 5A-5F show a second design of the recess 221. In the second design, the recess 221 has a trapezoid cross-section in the r-x plane. Also, the recess 221 is configured so as to be arcuate in the r-u plane and has a rectangular cross-section in the x-u plane. The first side wall 223 in the r-x plane runs linearly between the recess base 222 and the side face 240, parallel to the axial direction x. The second side wall 224 runs in the r-x plane linearly between the recess base 222 and the side face 240 at an angle β. In some embodiments, the first side wall 223 may run in the r-x plane linearly between the recess base 222 and the side face 240 at an angle α, and/or the second side wall 224 may run in the r-x plane linearly between the recess base 222 and the side face 240 at an angle β. In this design, the recess base 222 is formed flat and runs parallel to the r-u plane. The angles α and β are measured between the respective side wall 223, 224 and the r-u plane or side face 240. For the case that both side walls 223, 224 run at an angle α and β between the recess base 222 and side face 240, these angles may also assume different values. The angle α may in particular assume values between $20° < \alpha < 160°$. Preferably, the angle α may assume values of $\alpha \leq 90°$. The angle β may assume values between $20° < \beta < 160°$. Preferably, the angle β may assume values of β≥90°. In some embodiments, the recess 221 may also have a trapezoid cross-section in the r-u plane and/or in the x-u plane.

FIGS. 6A-7F illustrate a third design of the recess 221. In the third design, the recess 221 has a triangular cross-section in the r-x plane. Also, the recess is configured so as to be arcuate in the r-u plane. The first side wall 223 runs in the r-x plane linearly between the recess base 222 and the side face 240 at an angle α or parallel to the axial direction x. The second side wall 224 runs in the r-x plane linearly between the recess base 222 and the side face 240, parallel to the axial direction x or at an angle β. In some embodiments, the first side wall 223 may run in the r-x plane linearly between the recess base 222 and the side face 240 at an angle α, and/or the second side wall 224 may run in the r-x plane linearly between the recess base 222 and the side face 240 at an angle β. In this design, the recess base 222 is configured so as to be linear. The angles α and β are here measured between the respective side wall 223, 224 and the r-u plane or side face 240. For the case that both side walls 223, 224 run at an angle α and β between the recess base 222 and side face 240, these angles may also assume different values. The angle α may in particular assume values between 20°<α<160°. Preferably, the angle α may assume values of α≤90°. The angle β may assume values between 20°<β<160°. Preferably, the angle β may assume values of β≥90°. In some embodiments, the recess 221 may also be configured so as to be triangular in the r-u plane and/or have a triangular cross-section in the x-u plane. As evident in FIG. 6C and FIG. 7C, the side wall 223 is configured so as to be arcuate in the x-u plane between the first and second transverse walls 225, 226, in particular with a curvature in the direction of the axial direction x (convex) or with a curvature against the axial direction x (concave). Also, the linear recess base 222 may be configured so as to be arcuate in the x-u plane and/or in the r-u plane.

FIGS. 8A-8F illustrate a fourth design of the recess 221. In the fourth design, the recess 221 has a triangular cross-section in the x-u plane and is configured so as to be arcuate in the r-u plane. In the r-x plane, the recess 221 has a rectangular cross-section. The first transverse wall 225 runs in the x-u plane linearly between the recess base 222 and the side face 240 at an angle σ. The second transverse wall 226 runs in the x-u plane linearly between the recess base 222 and the side face 240, parallel to the axial direction x. In some embodiments, the first transverse wall 225 may run in the x-u plane linearly between the recess base 222 and the side face 240 at an angle σ, and/or the second transverse wall 226 may run in the x-u plane linearly between the recess base 222 and the side face 240 at an angle σ. The recess base 222 is configured so as to be linear. The angles σ and φ are here measured between the respective transverse wall 225, 226 and the r-u plane. For the case that both transverse walls 225, 226 run at an angle σ and φ between the recess base 222 and side face 240, these angles may also assume different values. The angle σ may in particular assume values between 20°<σ<160°. Preferably, the angle σ may assume values of σ≤90°. The angle φ may in particular assume values between 20°<σ<160°. Preferably, the angle σ may assume values of σ≥90°. In some embodiments, the recess 221 may also be configured to be triangular in the r-u plane and/or have a triangular cross-section in the x-u plane.

Figures 9A, 9B, 9C, 9D, 9E, 9F:
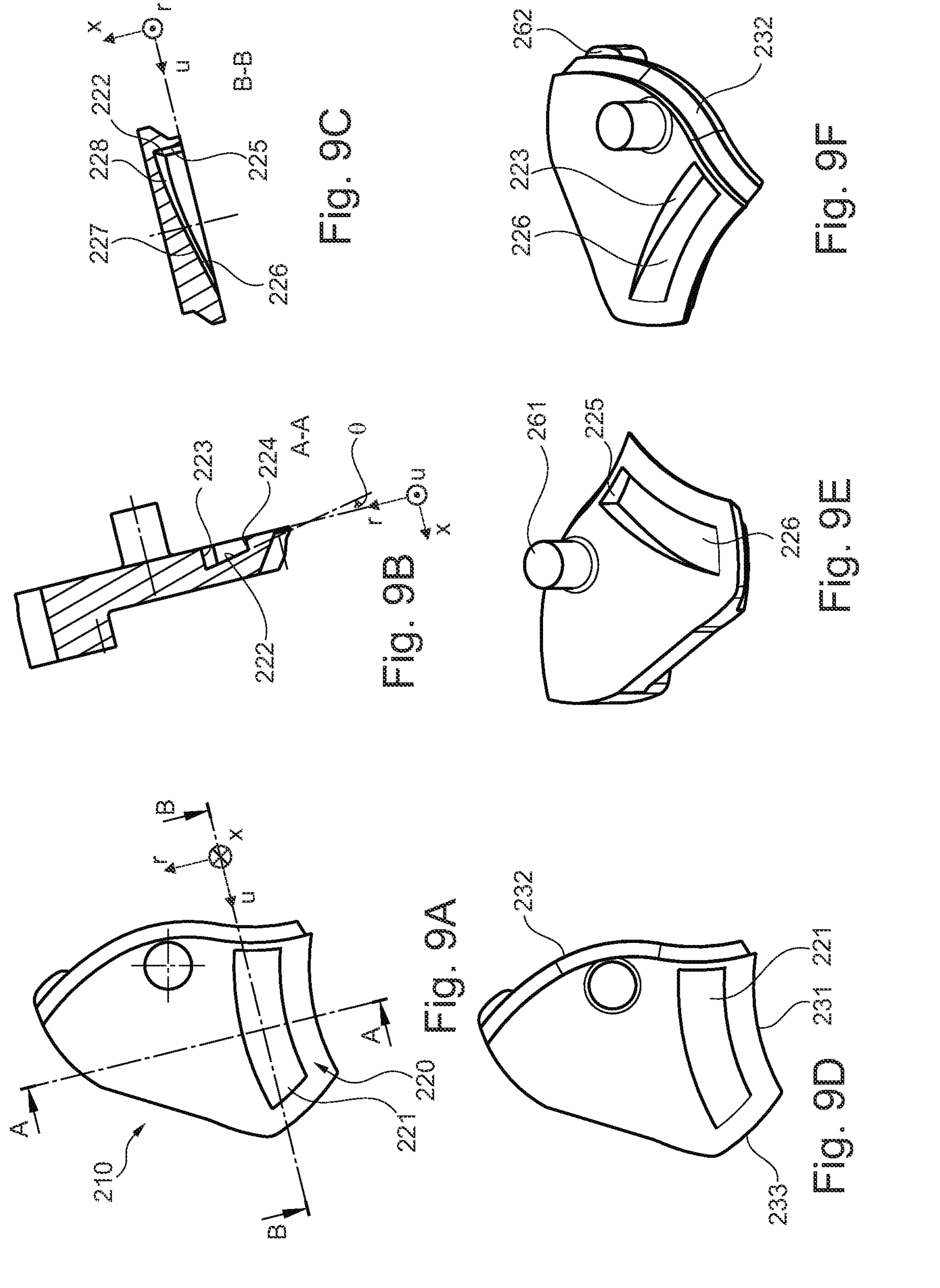
Figure 10C:
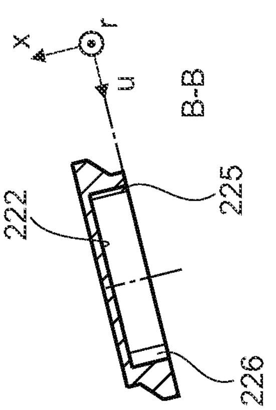
Figure 10B:
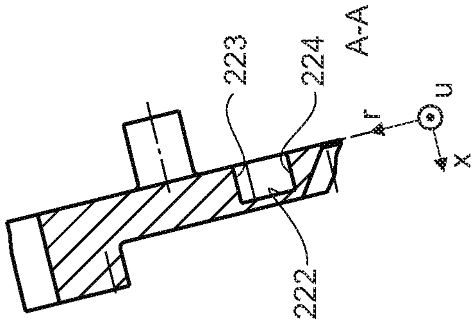
Figure 10A:
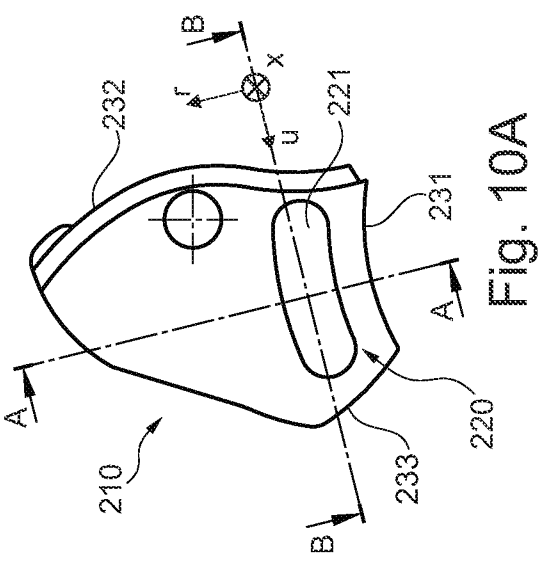
Figure 10F:
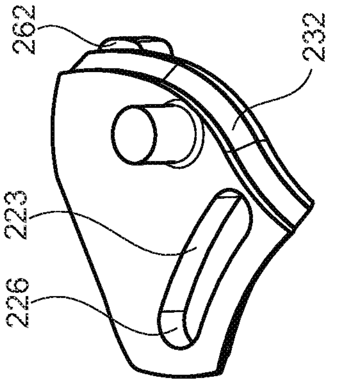
Figure 10E:
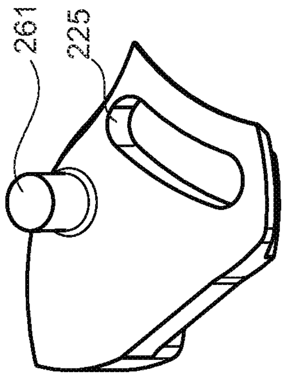
Figure 10D:
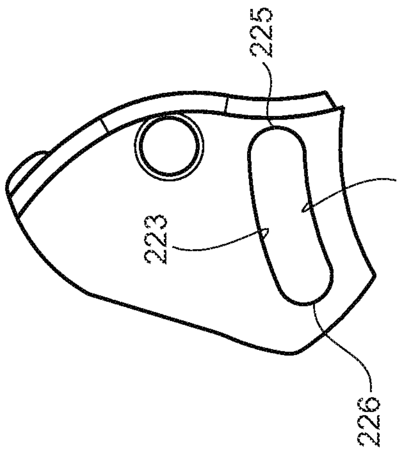
Figure 11A:
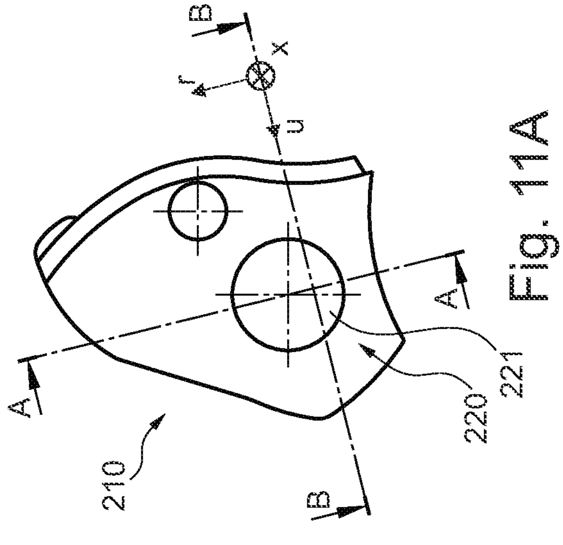
Figure 11B:
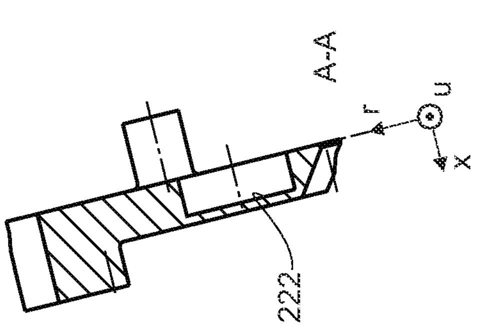
Figure 11C:
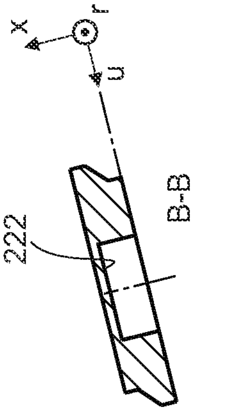
Figure 11D:
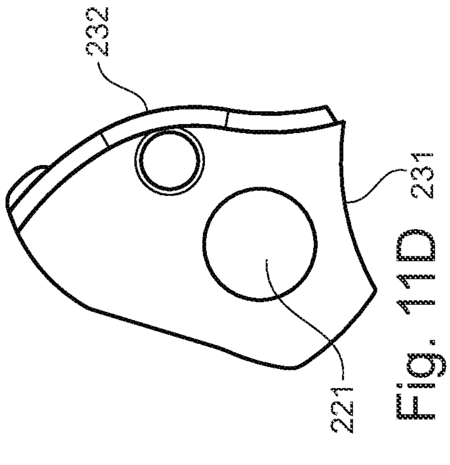
Figure 11E:
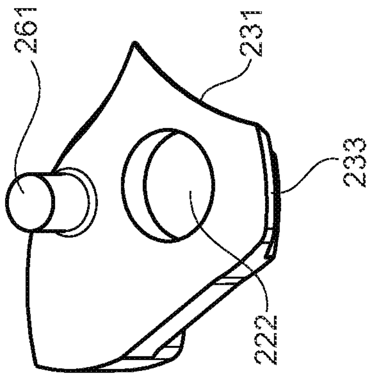
Figure 11F:
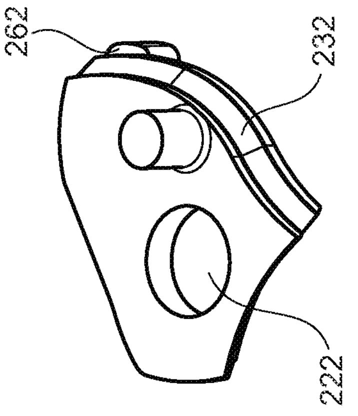
Figures 12A, 12B, 12C, 12D, 12E, 12F:
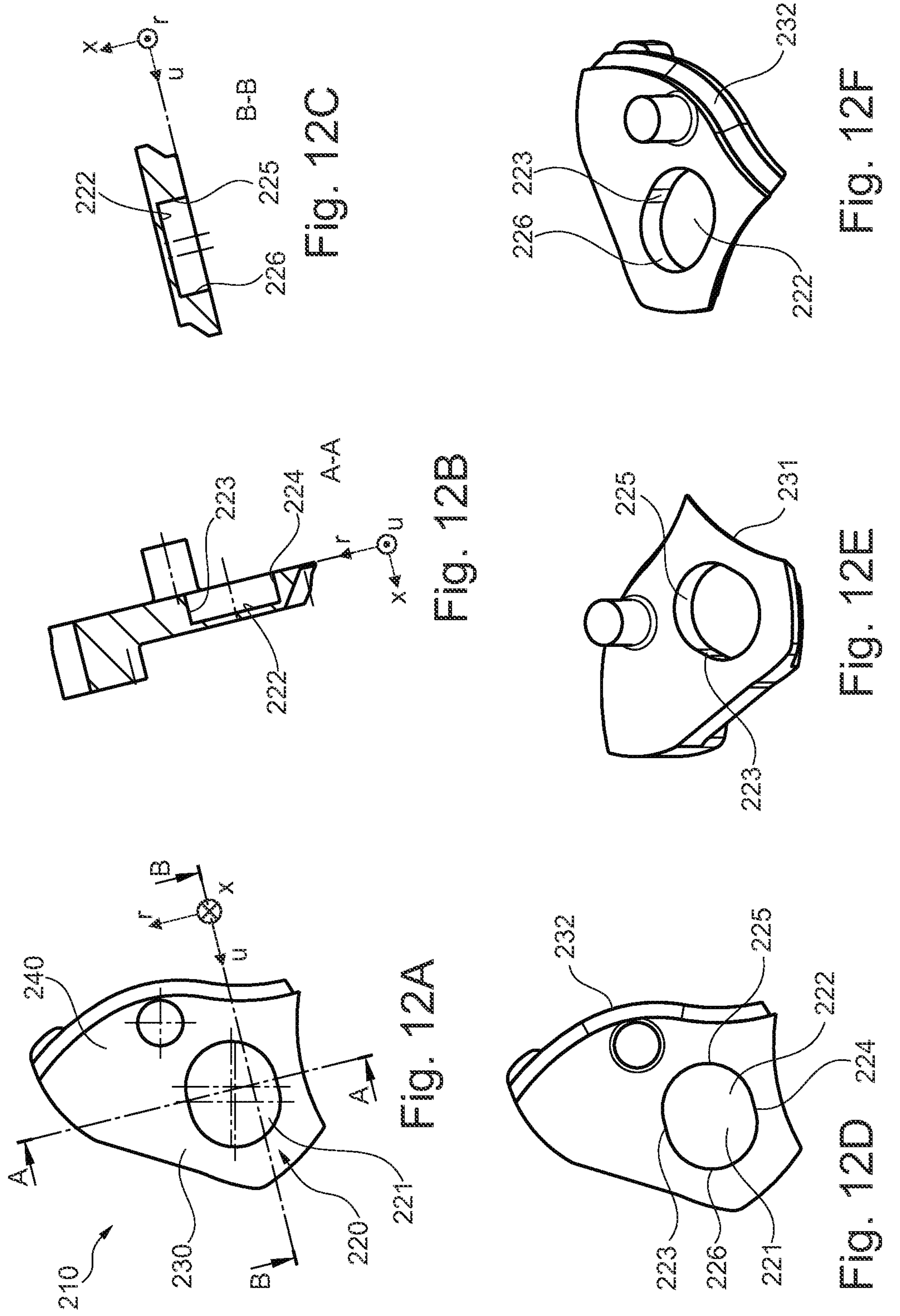
Figure 13C:
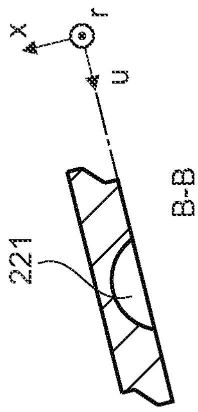
Figure 13B:
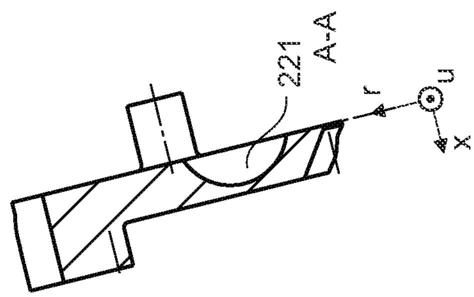
Figure 13A:
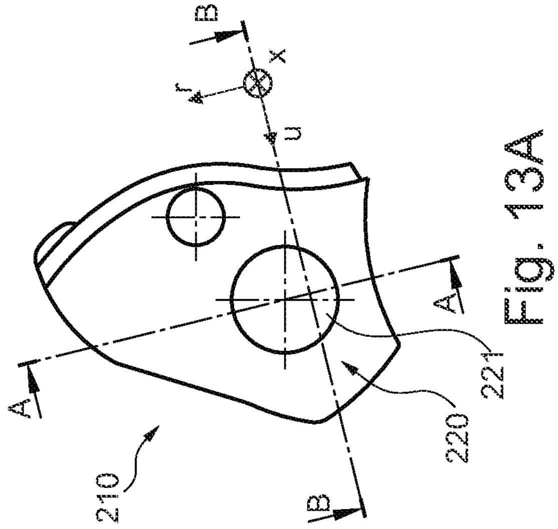
Figure 13F:
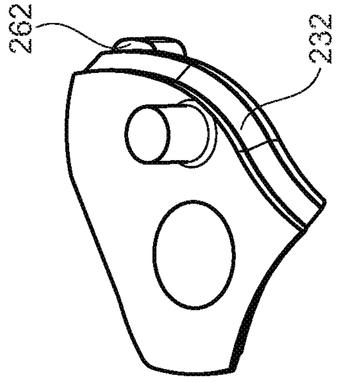
Figure 13E:
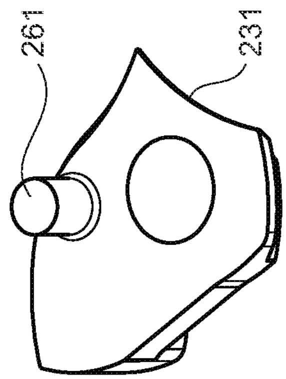
Figure 13D:
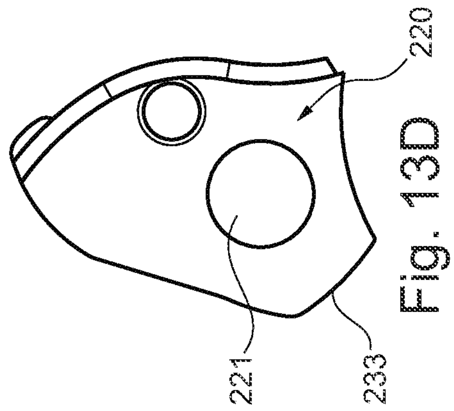
Figure 14A:
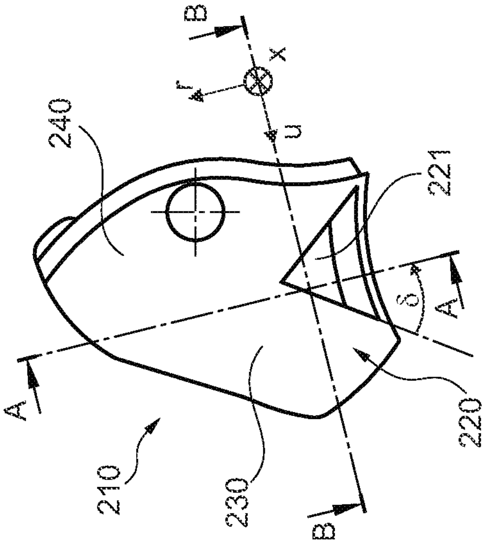
Figure 14B:
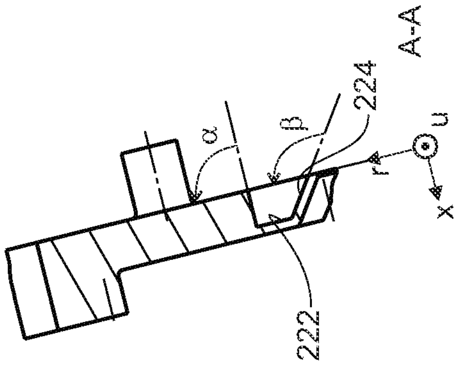
Figure 14C:
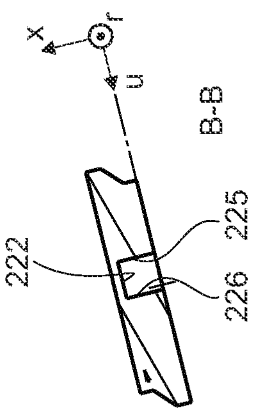
Figure 14D:
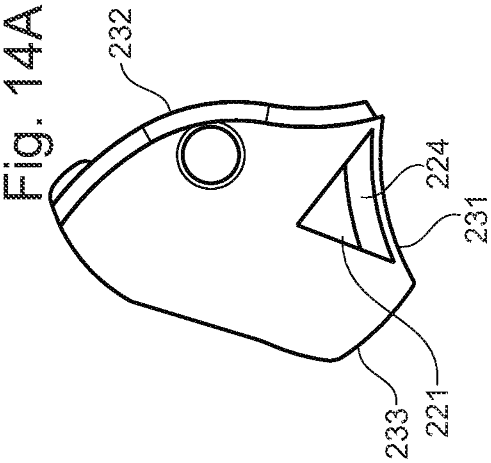
Figure 14E:
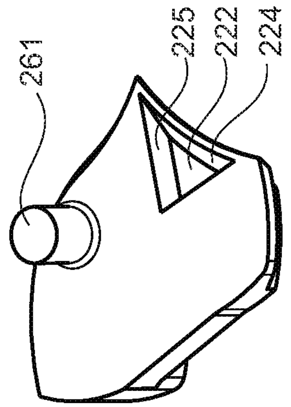
Figure 14F:
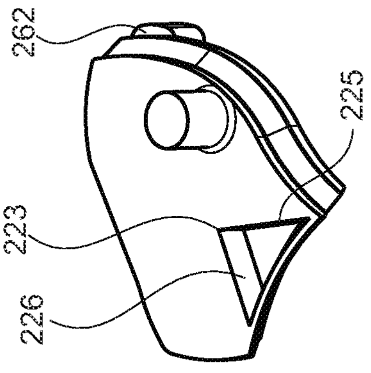
Figures 15A, 15B, 15C, 15D, 15E, 15F:
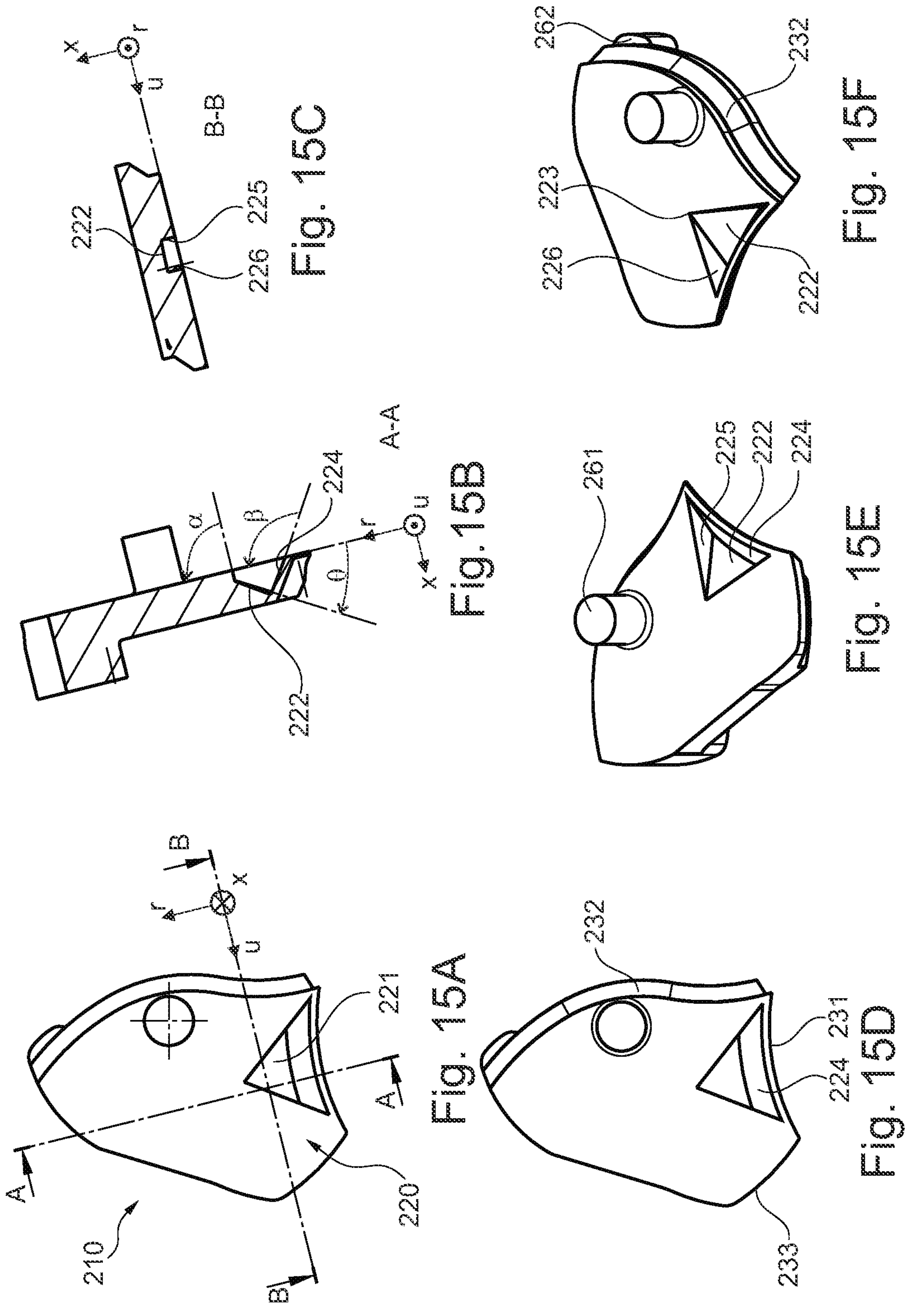
Figure 16A:
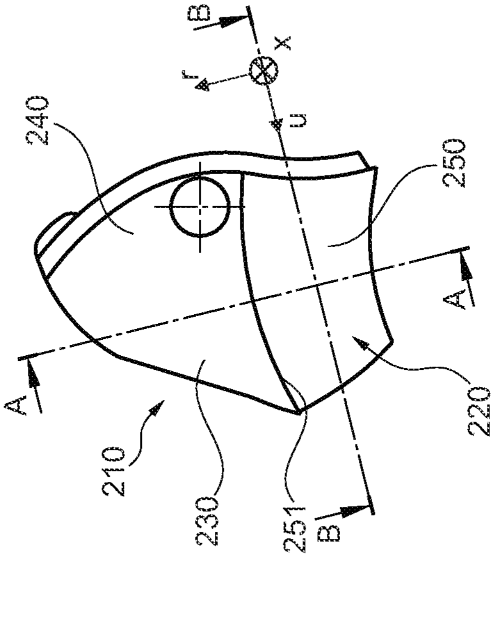
Figure 16B:
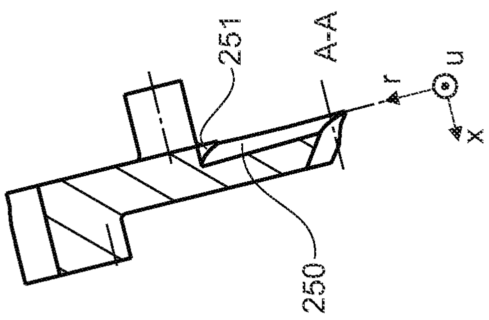
Figure 16C:
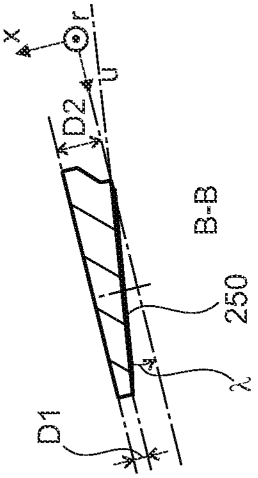
Figure 16D:
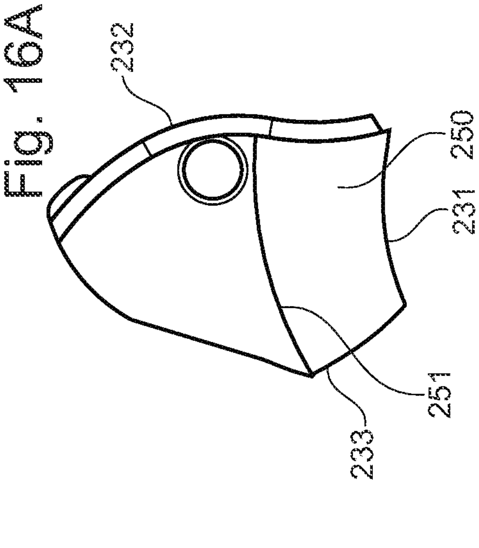
Figure 16E:
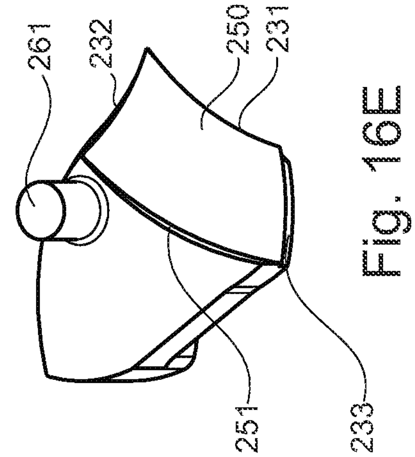
Figure 16F:
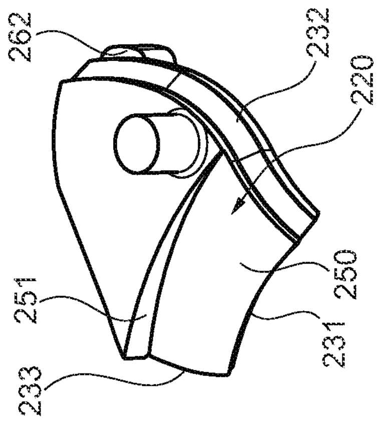

FIGS. 9A-9F illustrate a fifth design of the recess 221. In the fifth design, the recess 221 is configured so as to be arcuate in the r-u plane. In the r-x plane, the recess base 222 runs linearly at an angle θ to the side face 240. The angle θ is here measured between the r-u plane and the recess base 222. The angle θ may in particular assume values between −90°<θ<90°. Preferably, the angle θ may assume values of −60°<θ<60°. In this design, the recess 221 has a trapezoid cross-section in the r-x plane. The recess base 222 may also run linearly in the x-u plane at an angle to the r-u plane. As shown in FIG. 9C, the second transverse wall 226 starting from the side face 240 has a first transverse wall portion 227 and a second transverse wall portion 228. The first transverse wall portion 227 is configured so as to be linear in the x-u plane, and the second transverse wall portion 228 is configured so as to be arcuate in the x-u plane. The second transverse wall portion 228 is formed between the recess base 222 and the first transverse wall portion 227. The second transverse wall 226 may also be designed accordingly in the r-u plane and/or in the r-x plane. In some embodiments, the first transverse wall 225, the first side wall 223 and/or the second side wall 224 may be configured accordingly.

FIGS. 10A-10F show a sixth design of the recess 221. In the sixth design, the recess 221 is configured so as to be slot-like in the r-u plane. In the r-x plane and in the x-u plane, the recess 221 has a rectangular cross-section. The first transverse wall 225 and the second transverse wall 226 are designed so as to be semicircular in the r-u plane and extend between the first side wall 223 and the second side wall 224. The two side walls 223, 224 are formed parallel to one another. The recess 221 is also configured so as to be arcuate in the r-u plane, wherein the side walls 223, 224 run in arcuate form. As shown in FIGS. 12A-12F, the slot-like recess 221 may also be designed so as to be linear in the r-u plane, in particular wherein the two side walls 223, 224 run parallel to one another and linearly.

FIGS. 11A-11F show a seventh design of the recess 221. In the seventh design, the recess 221 is configured so as to be circular in the r-u plane and has a rectangular cross-section in the r-x plane and/or in the x-u plane. The recess here runs in a cylindrical form from the side face 240 to the recess base 222, parallel to the axial direction x. In FIGS. 13A-13F, the recess 221 is configured so as to be circular in the r-u plane and has a semicircular cross-section in the r-x plane and in the x-u plane.

FIGS. 14A-14F show an eighth design of the recess 221. In the eighth design, the recess 221 is configured so as to be triangular in the r-u plane, has a trapezoid cross-section in the r-x plane and a rectangular cross-section in the x-u plane. The first transverse wall 225 and/or the second transverse wall 226 run together at an angle δ which is measured between the first transverse wall 225 and/or the second transverse wall 226 and the radial direction r. The angle δ may in particular assume a value of between 0°<δ<90°. Preferably, the angle δ may assume values from 10°<δ<45°. The angle between the first transverse wall 225 and the radial direction r, and/or between the second transverse wall 226 and the radial direction r, may be formed differently or identically. The first side wall 223 is here are omitted and is shown merely in line or dot form (see FIG. 14F). The recess 221 configured so as to be triangular in the r-u plane may however be provided arbitrarily rotated about the axial direction x. The first transverse wall 225 and the second transverse wall 226 here each run parallel to the axial direction x between the recess base 222 and the side face 240. The second side wall 224 here runs between the side face 240 and the recess base 222 at an angle β>90°. In FIGS. 15A-15F, the recess 221 is again configured so to be triangular in the r-u plane, but is also configured so as to be polygonal in the r-x plane and rectangular in the x-u plane. In the r-x plane, the recess base 222 runs at an angle θ<0° and the first side wall 223 runs at an angle $\alpha$=90°. The first side wall 223 is configured so as to be linear. The second side wall 224 runs at an angle $\beta$>90°.

FIGS. 16A-16F show a further embodiment of the eddy-reducing feature 220. The eddy-reducing feature 220 is configured as the chamfer 250 on the baffle element 210. The chamfer 250 runs linearly in the x-u plane between the first side edge 232 and the second side edge 233 at an angle $\lambda$. If the plurality of baffle elements 210 are arranged in the circumferential direction 26, then because of the chamfer 250, between adjacent baffle elements 210, the side edge 232 protrudes in the axial direction 22 beyond the chamfer 250 and hence forms an edge which runs substantially parallel or at an angle to the r-x plane. This edge between the baffle elements 210 may reduce an eddy formation. The angle $\lambda$ is measured between the chamfer 250 and the r-u plane. The chamfer 250 at the second side edge 233 has a thickness D1 measured parallel to the axial direction x, and at the first side edge the thickness D2. The chamfer 250 may however also have the thickness D at the first side edge 232, wherein D>D2>D1. In the r-x plane, the chamfer 250 has a linear cross-section, wherein the chamfer 250 runs parallel to the r-u plane. In some embodiments, the chamfer 250 in the r-x plane may run at an angle to the r-u plane. As illustrated for example in FIG. 16A and FIG. 16F, the chamfer 250 has a side wall 251 which extends between the first side edge 232 and the second side edge 233. Also, the side wall 251 extends parallel to the axial direction x between the side face 240 and the chamfer 250. The side wall 251 is configured so as to be arcuate in the r-u plane and has a curvature in the radial direction r. The chamfer 250 is delimited by the first side edge 232, the second side edge 233, the inner edge 231 and the side wall 251. The side wall in the r-u plane may run substantially parallel to the inner edge 231. In some embodiments, the side wall 251 may also run linearly in the r-u plane. The side wall may also contribute to a reduction in eddy formation.

Although various embodiments and designs of the eddy-reducing feature 220 are shown in FIGS. 4A-16F and described above, several of the embodiments and/or designs may also be arranged on one baffle element 210. For example, on one baffle element 210, a first recess may be formed with an arcuate shape in the r-u plane and a second recess with a circular shape. In some embodiments, several recesses may be arranged on one baffle element 210, for example two, three, four, five or more of the same design and/or different design. If several recesses are provided, these may be arranged separately from one another. In other words, these recesses are then separated from one another by a wall. Naturally, one or more recesses 221, and one or more chamfers 250, may also be provided on one baffle element 210. If however precisely one eddy-reducing feature 220 is arranged on the baffle element 210, also only one recess 221 or one chamfer 250 may be arranged on one baffle element 210.

As illustrated in FIGS. 2-3, the adjustment mechanism 200 comprises the bearing ring 260 in which the baffle elements 210 are rotatably mounted. In the fitted/installed state of the adjustment mechanism 200 in the compressor 300, in particular upstream of the compressor impeller 310, the bearing ring 260 is arranged in the axial direction 22 between the plurality of baffle elements 210 and the compressor impeller 310. Here, the bearing ring 260 is in contact with the flow. As shown in FIG. 3, the bearing ring 260 has an eddy-reducing feature 280. Because of the eddy-reducing feature 280 in the bearing ring 260, an eddy formation between the baffle elements and the compressor impeller can be reduced or eliminated, which leads to noise reduction. Also, a structural fatigue of the compressor impeller 310 can be reduced since fewer vibrations occur. In some embodiments (as shown in FIGS. 2-3), the eddy-reducing feature 280 may be provided in the bearing ring 260 and the eddy-reducing feature 220 in the baffle elements 210. It is however also possible that only the eddy-reducing feature 280 is provided in the bearing ring 260, or only the eddy-reducing feature 220 in the baffle elements 210. The eddy-reducing feature 280 comprises at least one recess 281 which extends into the bearing ring 260 in the radial direction 24 from an inner edge 263 of the bearing ring 260. Here, several recesses 281 may be provided which are arranged spaced apart from one another on the inner edge 263. The recesses 281 may be arranged evenly in the circumferential direction 26, and/or be arranged in groups and/or at different intervals. The at least one recess 281 may be configured according to one or more of the designs/embodiments of the recess 221. Accordingly, it should be noted that the at least one recess 281 extends into the bearing ring 260 not in the axial direction x but in the radial direction 24 from the inner edge 263. Also, the side walls of the recess 280 adjoining the inner edge 263 have a curvature corresponding to the course of the inner edge 263.

Instead of providing recesses 281 on the inner edge 263 of the bearing ring 260, in another embodiment the eddy-reducing feature 280 may comprise at least one protrusion which extends from the inner edge 263 of the bearing ring 260 in the radial direction 24 towards the axis 22 (not shown in the figures). The eddy-reducing feature 280 may also comprise several protrusions, for example two, three, four, five, six, seven, eight or more, which are arranged in the circumferential direction 26 on the inner edge 263 of the bearing ring 260 and are spaced apart from one another. The protrusions may be configured with various shapes, for example as a cube, cuboid, pyramid, truncated pyramid, cone, cylinder, parallelepiped or polygonal prism. In this embodiment, the bearing ring 260 is arranged set back in the radial direction 24 with respect to the compressor inlet 322. In other words, in this embodiment, the bearing ring 260 has an inner diameter which is greater than an inner diameter of the compressor inlet 322. The at least one protrusion may extend starting from the inner edge 263 of the bearing ring 260 in the radial direction 24 up to the inner diameter of the compressor inlet 322. An eddy formation may be reduced or prevented by the at least one recess 281 or the at least one protrusion on the inner edge 263 of the bearing ring 260.

As described above, in an alternative embodiment of the adjustment mechanism 200, the bearing ring 260 may be omitted (not shown in figures). In such a design, the baffle elements 210 may be rotatably mounted directly in the compressor housing 320 (or in the coaxial depression 328). In particular, the baffle elements 210 may here be mounted in the housing part 150. In the installed/mounted state of the adjustment mechanism 200 in the compressor 300, the adjustment ring 270 is arranged in the axial direction 22 between the plurality of baffle elements 210 and the compressor impeller 310, and may be in contact with the flow. The adjustment ring 270 may then be configured as a transmission ring between the baffle elements 210. In this design, the adjustment ring 270 may also comprise an eddy-reducing feature. The eddy-reducing feature may comprise at least one recess which extends into the adjustment ring 270 in the radial direction 24 from an inner edge of the adjustment ring 270. On the inner edge of the adjustment ring 270, several recesses may also be provided which are spaced apart from one another in the circumferential direction 26. The recesses may be distributed evenly over the circumference of the inner edge. Alternatively, or additionally, the recesses may be arranged in groups over the circumference of the inner edge of the adjustment ring 270. The recesses may here be configured according to the designs of the recess 221, wherein however the recesses do not extend in the axial direction but in the radial direction 24. Also, the side walls of the recess which adjoin the inner edge of the adjustment ring 270 have a curvature corresponding to the course of the inner edge.

Instead of providing recesses on the inner edge of the adjustment ring 270, in another embodiment the eddy-reducing feature may comprise at least one protrusion which extends from an inner edge of the adjustment ring 270 in the radial direction 24 towards the axis 22. The eddy-reducing feature may also comprise several protrusions, for example two, three, four, five, six, seven, eight or more, which are arranged in the circumferential direction 26 on the inner edge 263 of the adjustment ring 270 and are spaced apart from one another. The protrusions may here be configured with various forms, for example as a cube, cuboid, pyramid, truncated pyramid, cone, cylinder, parallelepiped or polygonal prism. In this design, the adjustment ring 270 is arranged set back in the radial direction with respect to the compressor inlet 322. In other words, in this embodiment, the adjustment ring 270 has an inner diameter which is greater than an inner diameter of the compressor inlet 322. The at least one protrusion may extend starting from the inner edge of the adjustment ring 270 in the radial direction 24 up to the inner diameter of the compressor inlet 322. An eddy formation may be reduced or prevented by the at least one recess or the at least one protrusion on the inner edge of the adjustment ring 270.

As shown in FIG. 3, the compressor inlet 322 comprises the inner circumferential face 323. The inner circumferential face 323 may have an eddy-reducing feature 330. In the installed/mounted state of the adjustment mechanism 200, in the axial direction 22, the eddy-reducing feature 330 is arranged between the compressor impeller 310 and the adjustment mechanism 200. The eddy-reducing feature 330 may reduce or prevent an eddy formation, which leads to noise reduction. Also, a structural fatigue of the compressor impeller 310 may be reduced since fewer vibrations occur. The eddy-reducing feature 330 comprises at least one recess 331 which extends into the compressor housing 320 in the radial direction 24 from the inner circumferential face 323. Several recesses 331, which are spaced apart from one another in the circumferential direction 26, may also be provided on the inner circumferential face 323 of the compressor inlet 322. The recesses 331 may be arranged evenly in the circumferential direction 26, and/or be arranged in groups and/or at different intervals. The at least one recess 331 be configured according to one or more of the designs of the recess 221. Accordingly, it should be noted here that the at least one recess 331 extends into the compressor housing 320 not in the axial direction x but in the radial direction 24 from the inner circumferential face 323 of the compressor inlet 322. Also, the side walls of the recess 331 which adjoin the inner circumferential face 323 have a curvature corresponding to the course of the inner circumferential face 323.

Although this disclosure describes an eddy-reducing feature 220 in one or more or all of the baffle elements 210, an eddy-reducing feature in the adjustment ring 270, an eddy-reducing feature 280 in the bearing ring 260, and/or an eddy-reducing feature 330 in the compressor housing 320 (in particular in the inner circumferential face 323 of the compressor housing 320), in some embodiments only one of these eddy-reducing features may be provided, or all of these eddy-reducing features may be provided, or these eddy-reducing features may be present in any arbitrary combination. In other words, in some embodiments the eddy-reducing feature 330 in the inner circumferential face 323 is provided, and/or the eddy-reducing feature 280 in the bearing ring 260, and/or the eddy-reducing feature in the adjustment ring 270, and/or the eddy-reducing feature 220 in the baffle elements. It is however also possible that only the eddy-reducing feature 330 in the inner circumferential face 323 is provided, or only the eddy-reducing feature 280 in the bearing ring 260, or only the eddy-reducing feature in the adjustment ring 270, or only the eddy-reducing feature 220 in the baffle elements. In other words, the respective embodiments may be provided independently of one another, wherein they each reduce or eliminate an eddy formation and hence can reduce noise or vibrations. For the case that no bearing ring 260 is provided and the baffle elements are mounted in the compressor housing 300 or in the housing part 150, also no eddy-reducing feature 280 may be provided. If the bearing ring 260 is provided and the adjustment ring 270 is not in contact with the flow and also not arranged between the baffle elements 210 and the compressor impeller 310 (as shown in FIGS. 2-3), then no eddy-reducing feature is also provided in the adjustment ring 270.

Although the present invention has been described above and is defined in the appended claims, it should be understood that the invention may be defined alternatively also according to the following embodiments.

1. An adjustment mechanism (200) for variable adjustment of an inlet cross-section (321) of a compressor inlet (322), comprising:
a plurality of rotatably mounted baffle elements (210) which are arranged in a circumferential direction (26) and are adjustable between a first position and a second position,
wherein at least one baffle element (210) of the plurality of baffle elements (210) comprises an eddy-reducing feature (220).
2. The adjustment mechanism (200) according to embodiment 1, wherein each baffle element (210) of the plurality of baffle elements (210) comprises an eddy-reducing feature (220).
3. The adjustment mechanism (200) according to embodiment 1 or embodiment 2, wherein each baffle element (210) of the plurality of baffle elements (210) which comprises an eddy-reducing feature (220) comprises precisely one eddy-reducing feature (220).
4. The adjustment mechanism according to any of the preceding embodiments, wherein each baffle element (210) of the plurality of baffle elements (210) comprises a plate body (230) with a first side face (240), wherein the eddy-reducing feature (220) is arranged on the first side face (240).
5. The adjustment mechanism (200) according to any of the preceding embodiments, wherein the eddy-reducing feature (220) comprises a recess (221) which is formed in the baffle element (210).
6. The adjustment mechanism (200) according to any of the preceding embodiments, wherein each baffle element (210) has a radial direction (r), a circumferential direction (u) lying perpendicularly to the radial direction (r), and an axial direction (x) lying perpendicularly to the radial direction (r) and the circumferential direction (u).

7. The adjustment mechanism (200) according to embodiment 6, wherein the recess (221) is designed longer in the circumferential direction (u) than in the radial direction (r), in particular by at least 30%, preferably by at least 50%.
8. The adjustment mechanism (200) according to embodiment 6 or embodiment 7, wherein the recess (221) is configured so as to be rectangular in the r-u plane.
9. The adjustment mechanism (200) according to embodiment 6 or embodiment 7, wherein the recess (221) is configured so as to be arcuate in the r-u plane.
10. The adjustment mechanism (200) according to any of embodiments 5 to 9, wherein the recess (221) comprises a recess base (222), a first side wall (223), a second side wall (224), a first transverse wall (225) and a second transverse wall (226), wherein the recess is delimited by the walls (223, 224, 225, 226) and the recess base (222).
11. The adjustment mechanism (200) according to embodiment 10, wherein the recess (221) has a depth (T) of at least 30%, preferably at least 60% of the thickness (D) of the plate body (230), wherein the depth (T) is measured between the first side face (240) and the recess base (222) parallel to the axial direction (x).
12. The adjustment mechanism (200) according to any of embodiments 6 to 11, wherein the recess (221) has a rectangular cross-section in the r-x plane and/or the recess (221) has a rectangular cross-section in the x-u plane.
13. The adjustment mechanism (200) according to any of embodiments 4 to 12, wherein each baffle element (210), in particular the plate body (230), has an inner edge (231), a first side edge (232) and a second side edge (233).
14. The adjustment mechanism (200) according to embodiment 13, wherein the first side wall (223) runs parallel to the second side wall (224), and/or the second side wall (224) runs parallel to the inner edge (231), and/or the first side wall (223) runs parallel to the inner edge (231).
15. The adjustment mechanism (200) according to embodiment 13 or embodiment 14, wherein the first transverse wall (225) runs parallel to the second transverse wall (226), and/or the first transverse wall (225) runs parallel to the first side edge (232), and/or the second transverse wall (226) runs parallel to the second side edge (233).
16. The adjustment mechanism (200) according to any of the preceding embodiments, wherein the recess base (222) is formed flat and runs parallel to the r-u plane.
17. The adjustment mechanism (200) according to any of embodiments 10 to 16, wherein the recess (221) has a trapezoid cross-section in the r-x plane, in particular wherein the first side wall (223) in the r-x plane runs linearly between the recess base (222) and the side face (240) at an angle $\alpha$, and/or wherein the second side wall (224) in the r-x plane runs linearly between the recess base (222) and the side face (240) at an angle $\beta$.
18. The adjustment mechanism (200) according to any of embodiments 10 to 16, wherein the recess (221) has a triangular cross-section in the r-x plane, in particular wherein the first side wall (223) in the r-x plane runs linearly between the recess base (222) and the side face (240) at an angle $\alpha$, and/or wherein the second side wall (224) in the r-x plane runs linearly between the recess base (222) and the side face (240) at an angle $\beta$.
19. The adjustment mechanism (200) according to any of embodiments 6 to 18, wherein the recess base (222) has an arcuate cross-section in the x-u plane.
20. The adjustment mechanism (200) according to any of embodiments 6 to 19, wherein the recess (221) has a triangular cross-section in the r-x plane, in particular wherein the first transverse wall (225) in the x-u plane runs linearly between the recess base (222) and the side face (240) at an angle $\sigma$, and/or wherein the second transverse wall (226) in the x-u plane runs linearly between the recess base (222) and the side face (240) at an angle $\varphi$.
21. The adjustment mechanism (200) according to any of embodiments 10 to 20, wherein the recess base (222) in the r-x plane runs linearly at an angle $\theta$ to the side face (240).
22. The adjustment mechanism (200) according to any of the preceding embodiments, wherein the second transverse wall (226) starting from the side face (240) has a first transverse wall portion (227) and a second transverse wall portion (228), in particular wherein the first transverse wall portion is configured so as to be linear in the x-u plane and wherein the second transverse wall portion (228) is configured so as to be arcuate in the x-u plane.
23. The adjustment mechanism (200) according to any of embodiments 5 to 7 and 10 to 22, wherein the recess (221) is configured so as to be slot-like in the r-u plane.
24. The adjustment mechanism (200) according to any of embodiments 5 to 7 and 10 to 22, wherein the recess is configured so as to be circular in the r-u plane.
25. The adjustment mechanism (200) according to embodiment 24, wherein the recess has a semicircular cross-section in the r-x plane and/or in the x-u plane.
26. The adjustment mechanism (200) according to embodiment 6, wherein the recess is configured so as to be triangular in the r-u plane, and has a trapezoid cross-section in the r-x plane and a rectangular cross-section in the x-u plane.
27. The adjustment mechanism (200) according to any of the preceding embodiments, wherein in the r-x plane, the recess base (222) runs at an angle $\theta<0°$, and the first side wall (223) runs at an angle $\alpha=90°$, and the second side wall (224) runs at an angle $\beta>90°$.
28. The adjustment mechanism (200) according to embodiment 6, wherein the eddy-reducing feature (220) is configured as a chamfer (250) on the baffle element (210), in particular wherein the chamfer (250) in the x-u plane runs linearly between the first side edge (232) and the second side edge (233) at an angle $\lambda$.
29. The adjustment mechanism (200) according to any of the preceding embodiments, furthermore comprising an adjustment ring (270), wherein the plurality of baffle elements (210) are operatively coupled to the adjustment ring (270), in particular wherein the adjustment ring (270) comprises several coupling recesses (271) distributed in the circumferential direction (26) for coupling with the baffle elements (210).
30. The adjustment mechanism (200) according to embodiment 29, wherein the adjustment ring (270) comprises an eddy-reducing feature.
31. The adjustment mechanism (200) according to embodiment 30, wherein the eddy-reducing feature comprises at least one recess which extends into the adjustment ring (270) in the radial direction (24) from an inner edge of the adjustment ring (270).

32. The adjustment mechanism (200) according to embodiment 30, wherein the eddy-reducing feature comprises at least one protrusion which extends from an inner edge of the adjustment ring (270) in the radial direction (24) towards the axis (22).
33. The adjustment mechanism (200) according to any of embodiments 29 to 32, furthermore comprising an actuating device (10) with a housing part (150) and a lever group with a bearing portion (120), a drive input portion (110) and a drive output portion (130), wherein the drive output portion (130) is designed to be coupled to the adjustment ring (270) of the adjustment mechanism (200) on a first side (157) of the housing part (150), and wherein the drive input portion (110) can be coupled to an actuator rod on a second side (159) of the housing part (150), wherein the lever group (100) is rotatably mounted in the housing part (150) via the bearing portion (120).
34. The adjustment mechanism (200) according to embodiment 33, wherein the adjustment ring (270) comprises at least one baffle recess (272) and preferably precisely one baffle recess (272) for coupling to the lever group (100).
35. The adjustment mechanism (200) according to any of the preceding embodiments, furthermore comprising a bearing ring (260) in which the baffle elements (210) are rotatably mounted, or wherein the baffle elements (210) are rotatably mounted in a compressor housing (320).
36. The adjustment mechanism (200) according to embodiment 35, wherein the bearing ring (260) has an eddy-reducing feature (280).
37. The adjustment mechanism (200) according to embodiment 36, wherein the eddy-reducing feature (280) comprises at least one recess (281) which extends into the bearing ring (260) in the radial direction (24) from an inner edge (263) of the bearing ring (260).
38. The adjustment mechanism (200) according to embodiment 36, wherein the eddy-reducing feature (280) comprises at least one protrusion which extends from an inner edge (263) of the bearing ring (260) in the radial direction (24) towards the axis (22).
39. The adjustment mechanism (200) according to any of the preceding embodiments, wherein the plurality of baffle elements (210) each comprise a bearing journal (261) via which they are adjustable between the first position and the second position.
40. The adjustment mechanism (200) according to any of the preceding embodiments, wherein the plurality of baffle elements (210) each comprise a coupling element (262) via which they are operatively coupled to coupling recesses (271) in the adjustment ring (270).
41. A compressor (300) comprising:
a compressor housing (320) and a compressor impeller (310) arranged therein, wherein the compressor housing (320) has a compressor inlet (322) with an inlet cross-section (321) and a compressor outlet (324) with a compressor volute (326),
characterized by an adjustment mechanism (200) according to any of the preceding embodiments, wherein the inlet cross-section (321) of the compressor inlet (322) is variably adjustable by means of the adjustment mechanism (200).
42. The compressor (300) according to embodiment 41, wherein the eddy-reducing feature (220) is arranged in the axial direction (22) on a side of the plurality of baffle elements (210) facing the compressor impeller (310), in particular wherein the side face (240) faces the compressor impeller (310).
43. The compressor (300) according to embodiment 41 or embodiment 42, wherein the compressor inlet (322) has an inner circumferential face (323), wherein the inner circumferential face (323) has an eddy-reducing feature (330), in particular wherein in the axial direction (22), the eddy-reducing feature (330) is arranged between the compressor impeller (310) and the adjustment mechanism (200).
44. The compressor (300) according to embodiment 43, wherein the eddy-reducing feature (330) comprises at least one recess (331) which extends into the compressor housing (320) in the radial direction (24) from the inner circumferential face (323).
45. The compressor (300) according to any of embodiments 41 to 44, wherein the adjustment mechanism (200) opens the inlet cross-section (321) in the first position of the baffle elements (210) and reduces this in the second position of the baffle elements (210).
46. The compressor (300) according to any of embodiments 41 to 45, wherein the housing part (150) serves as an inlet connector of the compressor housing (320) and is arranged on a flange face (327) of the compressor housing (320) on the compressor inlet side.
47. The compressor (300) according to any of embodiments 41 to 46, wherein the compressor housing (320) comprises a depression (328) coaxially surrounding the compressor inlet (322) for receiving the baffle elements (210), the adjustment ring (270) and optionally the bearing ring (260).
48. The compressor (300) according to any of embodiments 41 to 47, furthermore comprising an actuator with an actuator rod via which the actuator is coupled to the lever group (100).
49. A charging device (400) for an internal combustion engine or a fuel cell, comprising:
a drive unit (410) and a shaft (420),
characterized by a compressor (300) according to any of embodiments 41 to 48, wherein the compressor impeller (310) of the compressor (300) is coupled to the drive unit (410) via the shaft (420).
50. The charging device (400) according to embodiment 49, wherein the drive unit (410) is a turbine and/or an electric motor.

What is claimed:

1. A compressor (300) comprising:
a compressor housing (320) and a compressor impeller (310) arranged therein, wherein the compressor housing (320) has a compressor inlet (322) with an inlet cross-section (321) and a compressor outlet (324) with a compressor volute (326), and
an adjustment mechanism (200), wherein the inlet cross-section (321) of the compressor inlet (322) is variably adjustable by the adjustment mechanism (200),
wherein the adjustment mechanism (200) comprises:
a plurality of rotatably mounted baffle elements (210) which are arranged in a circumferential direction (26) and are adjustable between a first position and a second position,
wherein at least one baffle element (210) of the plurality of baffle elements (210) comprises precisely one eddy-reducing feature (220).

2. The compressor (300) as claimed in claim 1, wherein each baffle element (210) of the plurality of baffle elements (210) comprises an eddy-reducing feature (220).

3. The compressor (300) as claimed in claim 1, wherein each baffle element (210) of the plurality of baffle elements (210) comprises only one eddy-reducing feature (220).

4. The compressor (300) as claimed in claim 1, wherein each baffle element (210) of the plurality of baffle elements (210) comprises a plate body (230) with a first side face (240), wherein the eddy-reducing feature (220) is arranged on the first side face (240).

5. The compressor (300) as claimed in claim 4, wherein each baffle element (210) has a radial direction (r), a circumferential direction (u) lying perpendicularly to the radial direction (r), and an axial direction (x) lying perpendicularly to the radial direction (r) and to the circumferential direction (u).

6. The compressor (300) as claimed in claim 1, wherein the eddy-reducing feature (220) comprises a recess (221) which is formed in the baffle element (210).

7. The compressor (300) as claimed in claim 6, wherein each baffle element (210) of the plurality of baffle elements (210) comprises a plate body (230) with a first side face (240), the recess (221) is designed longer in a circumferential direction (u) than in a radial direction (r), and the recess (221) has a depth (T) of at least 30% of a thickness (D) of the plate body (230).

8. The compressor (300) as claimed in claim 1, wherein the eddy-reducing feature (220) is configured as a chamfer (250) on the baffle element (210).

9. The compressor (300) as claimed in claim 1, further comprising an adjustment ring (270), wherein the baffle elements (210) are operatively connected to the adjustment ring (270).

10. The compressor (300) as claimed in claim 1, further comprising a bearing ring (260) in which the baffle elements (210) are rotatably mounted, wherein the bearing ring (260) comprises an eddy-reducing feature (280).

11. The compressor (300) as claimed in claim 10, wherein the eddy-reducing feature (280) of the bearing ring (260) comprises at least one recess (281) which extends into the bearing ring (260) in the radial direction (24) from an inner edge (263) of the bearing ring (260), or wherein the eddy-reducing feature (280) of the bearing ring (260) comprises at least one protrusion which extends from an inner edge (263) of the bearing ring (260) in radial direction (24) towards axis (22).

12. The compressor (300) as claimed in claim 1, wherein the eddy-reducing feature (220) is arranged in an axial direction (22) on a side of the plurality of baffle elements (210) facing the compressor impeller (310).

13. The compressor (300) as claimed in claim 1, wherein the compressor inlet (322) has an inner circumferential face (323), wherein the inner circumferential face (323) has an eddy-reducing feature (330) arranged between the compressor impeller (310) and the adjustment mechanism (200) in an axial direction (22).

14. The compressor (300) as claimed in claim 1, wherein the eddy-reducing feature (330) comprises at least one recess (331) which extends into the compressor housing (320) in a radial direction (24) from the inner circumferential face (323).

15. The compressor (300) as claimed in claim 1, wherein the baffle elements (210) are rotatably mounted in the compressor housing (320).

16. A charging device (400) for an internal combustion engine or a fuel cell, the charging device (400) comprising:

a drive unit (410) and a shaft (420), characterized by a compressor (300) as claimed in claim 1, wherein the compressor impeller (310) of the compressor (300) is coupled to the drive unit (410) via the shaft (420).

17. The charging device (400) as claimed in claim 16, wherein the drive unit (410) is a turbine or an electric motor, or wherein the drive unit (410) is a turbine and an electric motor.

* * * * *